US011715276B2

(12) United States Patent
Spears et al.

(10) Patent No.: US 11,715,276 B2
(45) Date of Patent: Aug. 1, 2023

(54) SYSTEM AND METHOD OF GENERATING BOUNDING POLYGONS

(71) Applicant: Sixgill, LLC, Santa Monica, CA (US)

(72) Inventors: Logan Spears, Kingston, WA (US); Carlos Anchia, Plano, TX (US); Corey Staten, Columbus, OH (US); Wei Xu, Seattle, WA (US)

(73) Assignee: Sixgill, LLC, Santa Monica, CA (US)

( * ) Notice: Subject to any disclaimer, the term of this patent is extended or adjusted under 35 U.S.C. 154(b) by 0 days.

(21) Appl. No.: 17/131,697

(22) Filed: Dec. 22, 2020

(65) Prior Publication Data

US 2022/0198209 A1    Jun. 23, 2022

(51) Int. Cl.
    *G06T 11/20*   (2006.01)
    *G06T 7/12*    (2017.01)
    (Continued)

(52) U.S. Cl.
    CPC .......... *G06V 10/235* (2022.01); *G06F 18/213* (2023.01); *G06F 18/2413* (2023.01);
    (Continued)

(58) Field of Classification Search
    CPC .... A01K 29/005; G01S 17/89; G06K 9/6267; G06K 9/6232; G06K 9/6253; G06K 9/627;
    (Continued)

(56) References Cited

U.S. PATENT DOCUMENTS 7,969,440 B1 *   6/2011   Polyakov .............. G06T 11/203
                                                          345/442
11,176,691 B2    11/2021  Ghadyali et al.
                 (Continued)

FOREIGN PATENT DOCUMENTS

CN       108122239 B    12/2020
CN       111553397 B    4/2022
                 (Continued)

OTHER PUBLICATIONS

International Application No. PCT/US2021/073042, International Search Report and the Written Opinion, dated Apr. 28, 2022, 16 pages.

*Primary Examiner* — Tan H Tran
(74) *Attorney, Agent, or Firm* — Ahmann Kloke LLP

(57) ABSTRACT

An example system includes a first and second digital device. The first digital device may be configured to provide an interface displaying an image including a depiction of an object, place a bounding shape around the object, and crop contents of the bounding shape to create a portion. The second digital device may be configured to receive the portion, retrieve high-level features and low-level features, apply first Atrous Spatial Pyramid Pooling (ASPP) to the high-level features to aggregate the high-level features as aggregate features, concatenate results to create the aggregate features, up-sample, apply a convolution to the low-level features, concatenate the aggregate features with the low-level features after convolution to form combined features, segment the combined features to generate a polygonal shape outline along outer boundaries of the first object, and provide the first polygonal shape outline to the first digital device for display.

18 Claims, 16 Drawing Sheets

(51) Int. Cl.
*G06K 9/62* (2022.01)
*G06K 9/20* (2006.01)
*G06V 10/22* (2022.01)
*G06F 18/40* (2023.01)
*G06F 18/213* (2023.01)
*G06F 18/2413* (2023.01)

(52) U.S. Cl.
CPC .............. *G06F 18/40* (2023.01); *G06T 7/12* (2017.01); *G06T 11/203* (2013.01); *G06T 2200/24* (2013.01); *G06T 2207/30242* (2013.01)

(58) Field of Classification Search
CPC ... G06N 3/02; G06T 7/11; G06T 2207/10016; G06T 2207/20084; G06T 2207/30242; G06T 7/12; G06T 11/203; G06T 2200/24; G06V 10/255; G06V 20/49; G06V 40/10; G06V 10/235
See application file for complete search history.

(56) References Cited

U.S. PATENT DOCUMENTS

| | | |
|---|---|---|
| 11,468,582 B2 | 10/2022 | Yoo et al. |
| 2008/0159585 A1 | 7/2008 | True et al. |
| 2019/0130575 A1* | 5/2019 | Chen ................ G06N 3/084 |
| 2019/0236394 A1* | 8/2019 | Price ................. G06T 7/11 |
| 2020/0034948 A1 | 1/2020 | Park et al. |
| 2020/0159222 A1* | 5/2020 | Mao ................. G06T 7/593 |
| 2020/0272825 A1 | 8/2020 | Zhang |
| 2020/0327334 A1* | 10/2020 | Goren ................ G06N 3/02 |
| 2021/0365717 A1* | 11/2021 | Cao ................. G06N 3/0454 |
| 2022/0304546 A1 | 9/2022 | Pavani |
| 2022/0383620 A1 | 12/2022 | Yoo et al. |
| 2023/0068903 A1 | 3/2023 | Gadre et al. |

FOREIGN PATENT DOCUMENTS

| | | |
|---|---|---|
| WO | 2018187632 A1 | 10/2018 |
| WO | 2020243826 A1 | 12/2020 |

* cited by examiner

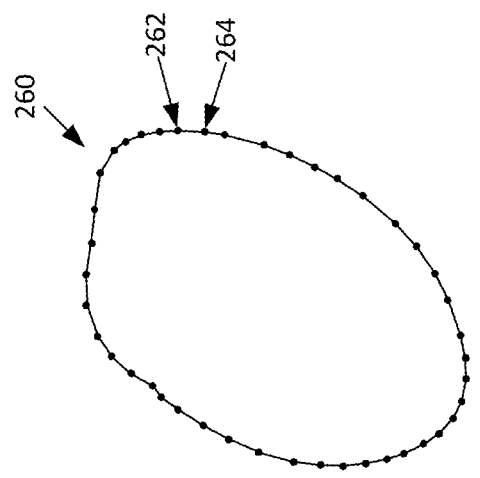
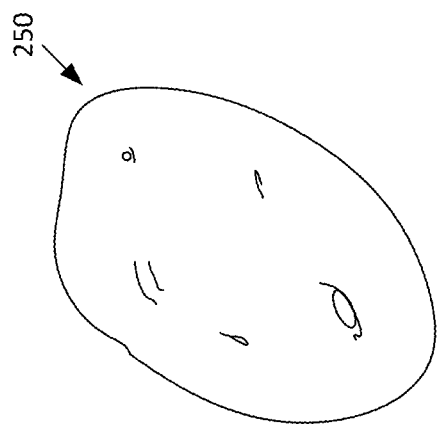
FIG. 2B

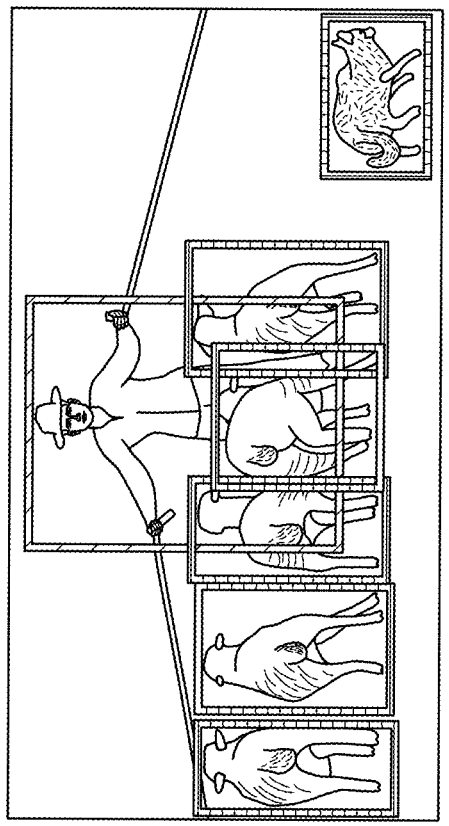
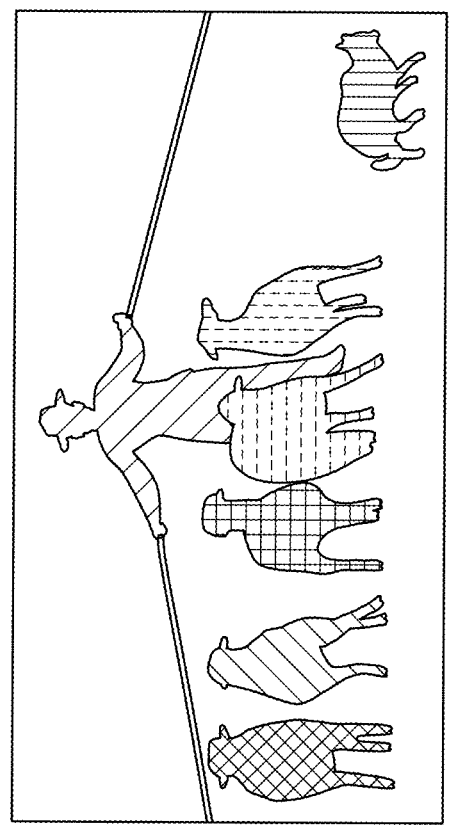
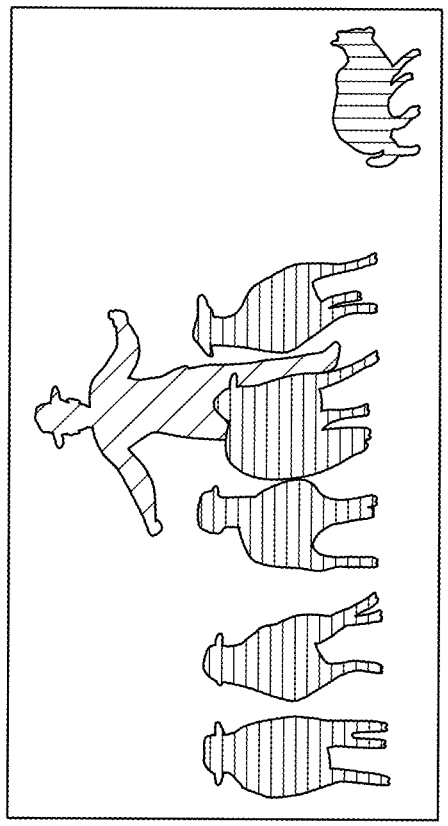
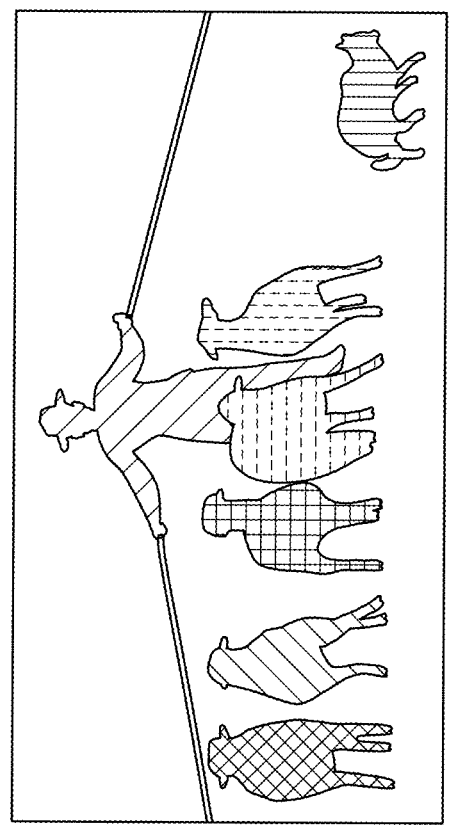
FIG. 7

SYSTEM AND METHOD OF GENERATING BOUNDING POLYGONS

FIELD OF THE INVENTION(S)

Embodiments of the present inventions related generally to training a machine learning (ML) model to generate bounding polygons for feature recognition.

BACKGROUND

Before an artificial intelligence (AI) or machine learning (ML) model may be utilized to learn and predict outcomes, the model must be trained to understand the data it is processing. This is accomplished by using labeled datasets as training data. Image labeling is used to label collections of images with meaningful tags. Existing solutions for creating labeled datasets include manually annotating digital images captured by an image capture device or still frames of a digital video. This can be a tedious, time-consuming process which creates bottlenecks in computer vision projects. For example, the ML model may need to annotate tens of thousands of images depicting different variations of an object, such as potatoes in order to generate a labeled dataset. Assuming that each image requires 2 minutes to annotate multiple polygonal shapes around each feature which make up the labeled dataset. The labeled dataset may require up to 500 hours of labeling time to accomplish and may delay the projects by weeks or months.

SUMMARY

An example system may include at least one processor and a first memory, the first memory containing instructions to control any number of the at least one processor to: provide a first user interface displaying at least one first image taken by a first image capture device, the first image capture device including a first field of view, the at least one first image including a depiction of a first object, the first object being of a particular type, the first image including a first bounding shape placed by a first user around the depiction of the first object using a shape tool provided by the first interface, extract a first portion of the first image, the first portion including only contents of the bounding shape that are contained within the first bounding shape including the depiction of the first object, retrieve first high-level features and first low-level features from the portion, the first high-level features including low spatial information content and high semantic content of the first portion, the first low-level features including high spatial information content and low semantic content of the first portion, apply first Atrous Spatial Pyramid Pooling (ASPP) to the first high-level features of the first portion to aggregate the first high-level features as first aggregate features, the applying the first ASPP including applying any number of convolutional layers in parallel and at different rates from each other to the first high-level features and concatenating results to create the first aggregate features, up-sample the first aggregate features, apply a convolution to the first low-level features, concatenate the first aggregate features after upsampling with the first low-level features after convolution to form first combined features, segment the first combined features to generate a first polygonal shape outline along first outer boundaries of the first object in the first portion, segmenting comprising batch normalization and application of a rectified linear activation function on the first combined features, and display the first image in the user interface and the first polygonal shape outline of the first object in the user interface, the first image not including the first bounding shape placed by the first user.

In some embodiments, the shape tool enables the user to draw a box around the first object in the at least one image. In various embodiments, the shape tool enables the user to place a box around the first object in the at least one image.

In various embodiments, a first digital device is configured to provide the user interface, display the at least one image, and provide at least the portion to a second digital device over a network and a second digital device is configured to retrieve the first high-level features and first low-level features, apply the ASPP to the first high-level features, up-sample the first aggregate features, apply the convolution to the first low-level features, concatenate the first aggregate features with the first low-level features, segment and update the first combined features, and provide the first polygonal shape outline to the first digital device, the first digital device further configured to display the first image in the user interface and the first polygonal shape outline of the first object in the user interface.

In some embodiments, the system further comprises a third digital device that is remote from the first digital device and is configured to provide a second user interface displaying at least one second image taken by a second image capture device, the at least one first second including a depiction of a second object, the second object being of the particular type, the second image including a second bounding shape placed by a second user around the depiction of the second object using the shape tool provided by the second interface, and extract a second portion of the second image, the second portion including only the bounding shape contents that are contained within the second bounding shape including the depiction of the second object. The second digital device may be further configured to retrieve second high-level features and second low-level features from the second portion, the second high-level features including low spatial information content and high semantic content of the second portion, the second low-level features including high spatial information content and low semantic content of the second portion, apply the first Atrous Spatial Pyramid Pooling (ASPP) to the second high-level features of the second portion to aggregate the second high-level features as second aggregate features, the first ASPP including applying any number of convolutional layers in parallel and at different rates from each other to the second high-level features and concatenating results to create the second aggregate features, up-sample the second aggregate features, apply a convolution to the second low-level features, concatenate the second aggregate features after upsampling with the second low-level features after convolution to form second combined features, segment and update the second combined features to generate a second polygonal shape outline along second outer boundaries of the second object in the second portion, and the third digital device further configured to display the second image in the user interface and the second polygonal shape outline of the second object, the second image not including the second bounding shape placed by the second user.

The first memory may further contain instructions to control any number of the at least one processor to further upsample the first polygonal shape outline. In some embodiments, the system may further comprise second memory, the second memory may contain instructions to control the any number of the at least one processor to: receive a second image from a second image capture device, the second image capture device being positioned over a second path, the image containing depictions of one or more second objects, the second objects being of the particular type, generate feature maps from the second image by applying at least a first convolutional neural network, slide a first window across the feature maps to obtain a plurality of anchor shapes using a region proposal network, determine if each anchor shape of the plurality of anchor shapes contains an object to generate a plurality of regions of interest, each of the plurality of regions of interest being a non-rectangular, polygonal shape, extract feature maps from each region of interest, classify objects in each region of interest using a pretrained convolutional neural network, trained in part using the first polygonal shape outline of the first object, in parallel with classification, predict segmentation masks on at least a subset of the plurality of regions of interest in a pixel-to-pixel manner, identify individual objects of the second image based on classifications and the segmentation masks, count individual objects based on the identification, and provide the count to a third digital device for display. Extracting the feature maps from the regions of interest comprises performing RoIAlign to extract the feature maps from each region of interest, ROIAlign utilizing binary interpolation to preserve spatial information which would otherwise get misaligned if ROI pool was applied. Each anchor shape may be a non-rectangular, polygonal shape.

An example system may comprise a first digital device and a second digital device. The first digital device may be configured to: provide a first user interface displaying at least one first image taken by a first image capture device, the at least one first image including a depiction of a first object, the first object being of a particular type, in response to a shape tool of the user interface used by a first user, placing a first bounding shape around a depiction of the first object, in response to a command from the user interface, crop a first portion of the first image, the first portion including contents of the bounding shape that are contained within the first bounding shape including the depiction of the first object but not including contents of the first image outside the first bounding shape. The second digital device configured to: receive the first portion from the first digital device, retrieve first high-level features and first low-level features from the first portion, the first high-level features including low spatial information content and high semantic content of the first portion, the first low-level features including high spatial information content and low semantic content of the first portion, apply first Atrous Spatial Pyramid Pooling (ASPP) to the first high-level features of the first portion to aggregate the first high-level features as first aggregate features, the applying the first ASPP including applying any number of convolutional layers in parallel and at different rates from each other to the first high-level features and concatenating results to create the first aggregate features, up-sample the first aggregate features, apply a convolution to the first low-level features, concatenate the first aggregate features after upsampling with the first low-level features after convolution to form first combined features, segment the first combined features to generate a first polygonal shape outline along first outer boundaries of the first object in the first portion, segmenting comprising batch normalization and application of a rectified linear activation function on the first combined features, and provide the first polygonal shape outline to the first digital device to enable the first digital device to display, in the user interface, the first image and the first polygonal shape outline of the first object.

The shape tool may enable the user to draw a box around the first object in the at least one image. The shape tool may enable the user to place a box around the first object in the at least one image.

In some embodiments, the system further comprises a third digital device that is remote from the first digital device, the third digital device configured to: provide a second user interface displaying at least one second image taken by a second image capture device, the at least one first second including a depiction of a second object, the second object being of the particular type, the second image including a second bounding shape placed by a second user around the depiction of the second object using the shape tool provided by the second interface, and extract a second portion of the second image, the second portion including only the bounding shape contents that are contained within the second bounding shape including the depiction of the second object. The second digital device further configured to retrieve second high-level features and second low-level features from the second portion, the second high-level features including low spatial information content and high semantic content of the second portion, the second low-level features including high spatial information content and low semantic content of the second portion, apply the first Atrous Spatial Pyramid Pooling (ASPP) to the second high-level features of the second portion to aggregate the second high-level features as second aggregate features, the first ASPP including applying any number of convolutional layers in parallel and at different rates from each other to the second high-level features and concatenating results to create the second aggregate features, up-sample the second aggregate features, apply a convolution to the second low-level features, concatenate the second aggregate features after upsampling with the second low-level features after convolution to form second combined features, segment and update the second combined features to generate a second polygonal shape outline along second outer boundaries of the second object in the second portion, and the third digital device further configured to display the second image in the user interface and the second polygonal shape outline of the second object, the second image not including the second bounding shape placed by the second user.

The second digital device may be further configured to upsample the first polygonal shape outline. In some embodiments, the system further comprises a third digital device configured to: receive a second image from a second image capture device, the second image capture device being positioned over a second path, the image containing depictions of one or more second objects, the second objects being of the particular type, generate feature maps from the second image by applying at least a first convolutional neural network, slide a first window across the feature maps to obtain a plurality of anchor shapes using a region proposal network, determine if each anchor shape of the plurality of anchor shapes contains an object to generate a plurality of regions of interest, each of the plurality of regions of interest being a non-rectangular, polygonal shape, extract feature maps from each region of interest, classify objects in each region of interest using a pretrained convolutional neural network, trained in part using the first polygonal shape outline of the first object, in parallel with classification, predict segmentation masks on at least a subset of the plurality of regions of interest in a pixel-to-pixel manner, identify individual objects of the second image based on classifications and the segmentation masks, count individual objects based on the identification, and provide the count to a third digital device for display. Extracting the feature maps from the regions of interest comprises performing RoIAlign to extract the feature maps from each region of interest, ROIAlign utilizing binary interpolation to preserve spatial information which would otherwise get misaligned if ROI pool was applied. Each anchor shape may be a non-rectangular, polygonal shape. The classification may not depend upon segmentation masks. In some embodiments, each segmentation mask encodes an associated object's spatial layout.

An example non-transitive computer readable medium may comprise instructions to control at least one processor to perform a method. The method may comprising: providing a first user interface displaying at least one first image taken by a first image capture device, the first image capture device including a first field of view, the at least one first image including a depiction of a first object, the first object being of a particular type, the first image including a first bounding shape placed by a first user around the depiction of the first object using a shape tool provided by the first interface, extracting a first portion of the first image, the first portion including only contents of the bounding shape that are contained within the first bounding shape including the depiction of the first object, retrieving first high-level features and first low-level features from the portion, the first high-level features including low spatial information content and high semantic content of the first portion, the first low-level features including high spatial information content and low semantic content of the first portion, applying first Atrous Spatial Pyramid Pooling (ASPP) to the first high-level features of the first portion to aggregate the first high-level features as first aggregate features, the applying the first ASPP including applying any number of convolutional layers in parallel and at different rates from each other to the first high-level features and concatenating results to create the first aggregate features, up-sampling the first aggregate features, applying a convolution to the first low-level features, concatenating the first aggregate features after upsampling with the first low-level features after convolution to form first combined features, segmenting the first combined features to generate a first polygonal shape outline along first outer boundaries of the first object in the first portion, segmenting comprising batch normalization and application of a rectified linear activation function on the first combined features, and displaying the first image in the user interface and the first polygonal shape outline of the first object in the user interface, the first image not including the first bounding shape placed by the first user.

BRIEF DESCRIPTION OF THE DRAWINGS

FIG. 2B depicts an example image of an object (a potato) and a number of positions that may be necessary to manually draw a polygonal shape around the object in an example

FIG. 7 depicts instance segmentation dataset according to some embodiments.

DETAILED DESCRIPTION

Figure 1A:
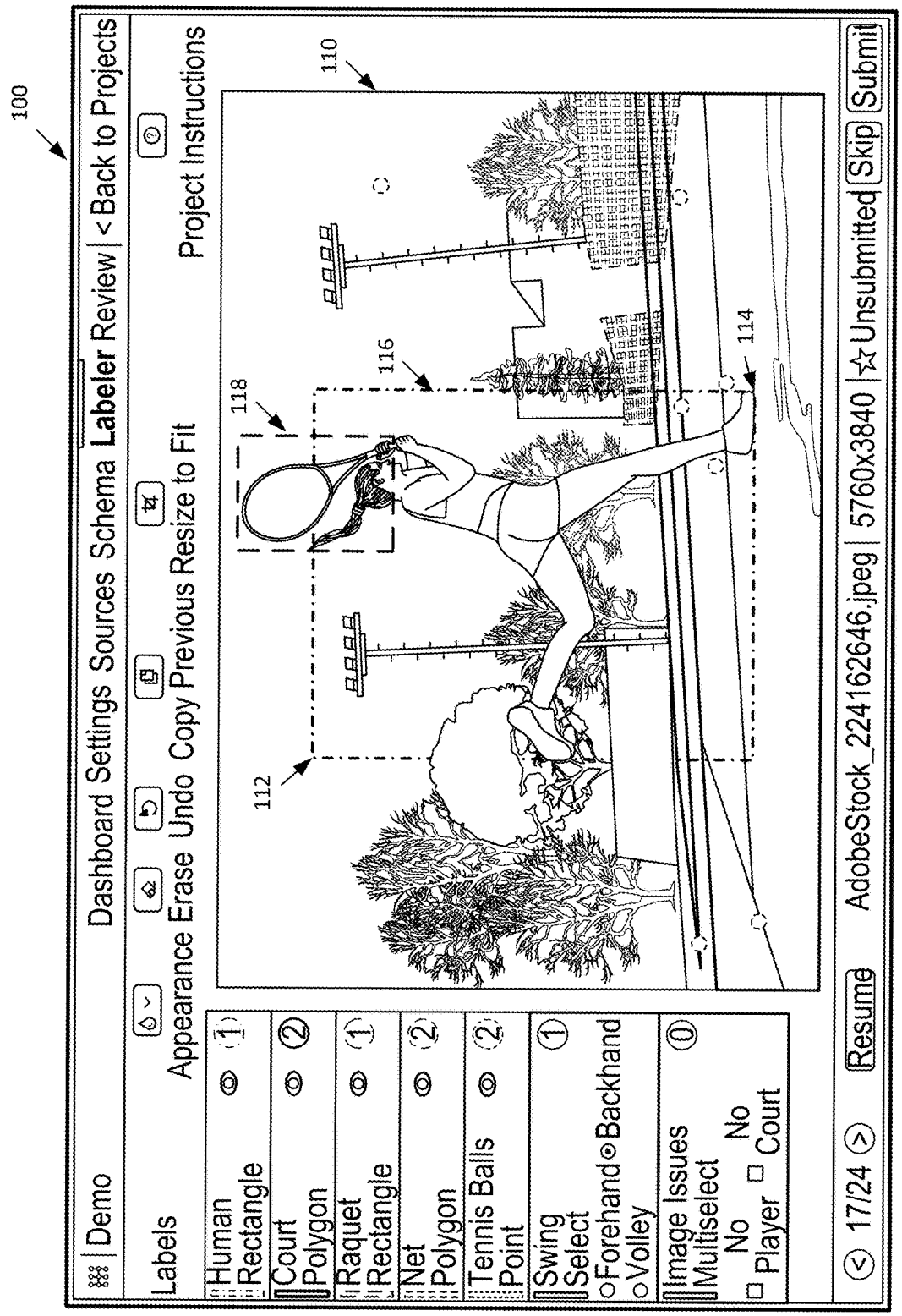
FIG. 1A depicts an example user interface for an object labeling system in some embodiments.

Various embodiments described herein include a system that enables a user to draw a box or other shape around an object represented in an image and the system may generate a polygonal shape that closely surrounds the edges of the object (e.g., the polygonal shape matches the outer boundary or outer contours of the object depicted in the image). This process may also be of use in selecting objects within an image without drawing a line around the object freehand or using symmetric shape(s) to approximate the object in the image. This process may be useful in image manipulation, selecting depicted objects in an image, copying objects depicted objects in an image, moving depicted objects in an image, saving depicted objects in an image, and/or the like.

In some embodiments, various systems described herein may assist in identifying and classifying objects within an image for identification. For example, a user may wish to identify and label objects within an image for clarification, education, entertainment, and/or the like.

In some embodiments, identifying objects in images may be useful in training AI and/or ML systems for object recognition and/or prediction. For example, some AI and/or ML systems, such as convolutional neural networks (CNNs), require a considerable number of different examples of depictions of objects in order to train the systems and generate models for object recognition of that particular type of object (e.g., potatoes, livestock, vegetables, people, animals, and the like).

In one example, a CNN may be trained to recognize objects and generate a model for object recognition. The model may be used in any number of ways. For example, a system may utilize one or more image capture devices mounted above a path. The one or more image capture devices may capture images as the objects move across the path. The images may be provided to a trained model to recognize the objects in the image (e.g., using instance segmentation), identify objects that meet certain specifications, count objects, and the like. In one example, the system may count potatoes, other vegetables, or fruit moving along a conveyor belt in order to provide accurate counts. In this example, the model may be generated after a CNN is trained using images of the vegetables or fruit to be counted. Rather than collecting numerous images and manually drawing a circle around each vegetable or fruit to train the system (which is tedious, prone to error, and time consuming), a user or system may draw a bounding box around each vegetable or fruit for automatic generation of a polygonal shape around the vegetable or fruit. This may save considerable time and avoid error in training the system.

Systems and methods described herein are not limited to inanimate or organic objects. It will be appreciated that any object may be captured. Objects may include animals (e.g., livestock, cats, dogs, people, and the like), furniture, pictures, and/or the like.

In some embodiments, an object labeling system may be executed by a digital device. The object labeling system may provide a user interface to allow the user to select an image for display within the user interface. The user interface may allow the user to select one or more objects in the display. The user may select an object in the image such as by drawing a shape (e.g., a box) around the object. The object labeling system may convert the box around the object to a polygonal shape that surrounds all or part of the object to enabling labeling or selection of the object and not the area outside the object (e.g., removing all or part of the image within the drawn shape that is not the object). In various discussions herein, the user is discussed as drawing a bounding box (e.g., rectangle, box, or the like) around an object of interest in an image. It will be appreciated that the user may draw any shape (e.g., circular, box, elliptical, freeform, or the like) around the object of interest and the object labeling system may convert that shape to a polygonal shape that more closely surrounds the object of interest (and not the area between the polygonal shape and the drawn shape or the rest of the image).

In some embodiments, the object labeling system may enable training an ML model to recognize objects. Objects which are rectangular or square may not be difficult to draw or place since these object require a couple of user interactions on the user interface (e.g., by using an input device such as a mouse or wireless stylus pen). However, with irregularly shaped objects such as potatoes may require multiple user interactions. FIG. 2B depicts an example image of an object (a potato) and a number of positions that may be necessary to manually draw a polygonal shape around the object in an example. The image of the potato 250 may be displayed in an interface. If a user is to manually draw a polygonal shape around the outer boundary (e.g., outer contour) of the depicted object, they may be required to draw a line and click on anchor points (e.g., anchor points 263, 264, and other dots along the boundary line) to create the polygonal shape 260. A bounding polygonal shape for the potato may require as many as 40 mouse clicks or more, where each mouse click creates one vertex of the bounding polygon. Edges of the polygon are created as successive vertices are created. If the object tracking system 202 is to be trained, the object tracking system 202 may require hundreds or thousands of images of example objects for training. Manually creating polygonal shapes is time consuming and prone to error. The object labeling system 210 may, in some embodiments, enable a user to draw a box or any shape around an object and then convert that box or shape to a polygonal shape around the object without the user manually drawing the polygonal shape.

A large number training images which contain different versions of the same type of object, such as potatoes, may need to be identified and fed into a machine learning system in order to create a labeled data set for the ML model to use to recognize the object (and/or recognize many objects as being a certain class or type).

In one example, an object labeling system includes a user interface such as an example user interface 100 of FIG. 1A. Area 110 represents a digital image uploaded to the object labeling system and displayed by a user. The user may use a shape tool or other tool from the user interface 100 by drawing or placing a square or rectangle around an object in the area 110 that encloses the object. In one example, A rectangle 116 may be annotated with two mouse clicks at areas 112 and 114 to capture the image of the tennis player (e.g., the object). The object labeling system may generate a bounding polygonal shape which follows the outer contours of the depicted object in the rectangle 116 to generate a bounding polygon 150 of FIG. 1B.

Figure 2A:
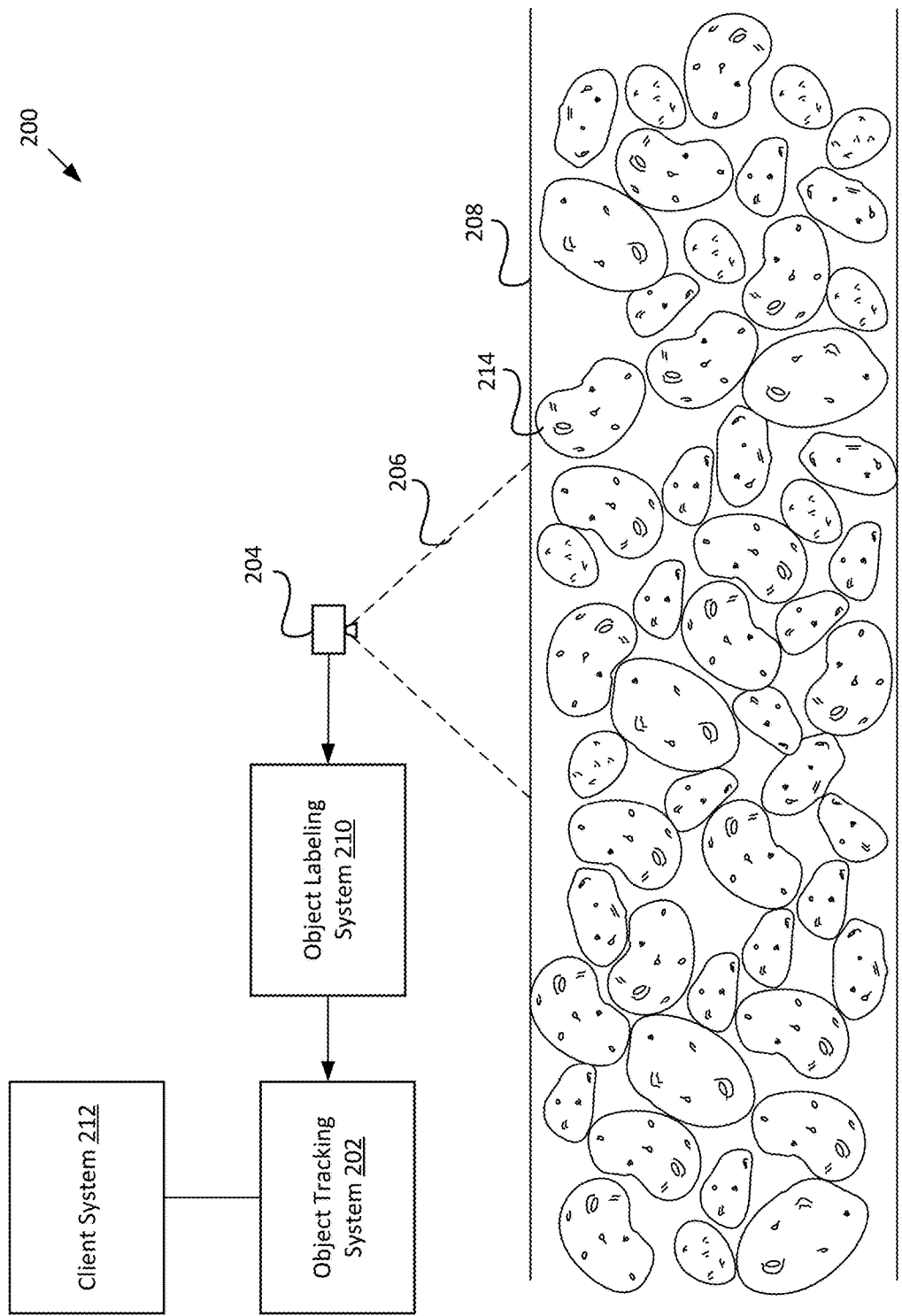
FIG. 2A depicts a block diagram of an environment for an example object labeling system according to some embodiments.

FIG. 2A depicts a block diagram of an example environment 200 capable of generating bounding polygons for feature recognition use in AI models according to some embodiments. The example environment includes an object tracking system 202, an image capture device 204 with a field of view 206, an object path 208, object labeling system 210, a client system 212, and inventory 214. The object tracking system 202 may be any device for classifying and/or identifying objects using systems and methods described herein. For example, the system 202 may be an object tracking system or a system that classifying and/or identifies any number of different objects that pass through the field of view 206.

In this example, the object tracking system 202 may be trained using the object labeling system 210 to recognize potatoes as the are moved across the object path 208. In this example, images of potatoes are taken by the image capture device 204. The object tracking system 202 may optionally include any number of machine learning systems that need to be trained to recognize the objects to be counted. In this example, the object labeling system 210 may be configured to present images to a user, receive boxes drawn over each image by the user around each potato, convert that box to a polygonal shape surrounding the contours of each object identified in the image, and then using the image of the (object limited to the polygonal shape and its contents) to train the machine learning system to create machine learning models. The models may subsequently be used to receive images from the image capture device 204 or any image capture device, recognize the objects using the trained models, and count or track the objects. The count or tracking may subsequently be provided to the client system 212.

Although the client system 212 appears to be connected to the object tracking system 202, and the object tracking system 202 appears to be connected to the object labeling system 210, it may be appreciated that the client system 212, object tracking system 202, and the object labeling system 210 may communicate with each other over a network (e.g., they may each be remote to each other). Further, there may be any number of devices in between the client system 212, object tracking system 202, and the object labeling system 210. In one example, images captured by the image capture device 204 may be provided via a communication network to a system or a local device. The local device may collect any number of images from the image capture device 204 and provide them via the communication network to a system. In some embodiments, the local device may include all or part of the functionality fo the object labeling system 210 discussed herein.

Any number of digital devices may include or have access to software (e.g., over a Saas system) that is or communicates with the object labeling system 210. Users or automated processes may provide each image for display within the object labeling system 210. Users may create boxes or other shapes around the objects of interest in each image. The object labeling system 210 may convert the box or other shape to the polygonal shape surrounding outer boundaries of the object of interest.

In some embodiments, the user or the object labeling system 210 may label any number of polygonal shape to provide an identifier, type identifier, classification, or the like. In some embodiments, the images of the objects from the polygonal shapes and, optionally, the identifier, type identifier, classification or the like may be provided to the object tracking system 202 to train the machine learning system and/or models.

Subsequently, once trained, there may be another image capture device capturing new images of similar objects that cross along a different object path. The images may be passed to the object counting system (e.g., either directly or over a network) for object recognition, counting, and/or tracking using the trained models.

The image capture device 204 may be any capture device, including, for example, a camera. In various embodiments, the image capture device 204 may be positioned over the object path 208. In some embodiments, the image capture device 204 may be or include any number of cameras capable of taking images or video over the object path 208. In some embodiments, the image capture device 204 is positioned 8-10 feet overhead of the base (e.g., ground, conveyer belt, tray, and/or the like) of the object path 208. It will be appreciated that the image capture device 204 may be positioned at any position over the object path 208. In different embodiments, the image capture device 204 may be positioned in front of the inventory, below the objects to be counted or tracked, from behind the objects to be counted or tracked, at any angle, or the like.

It may be appreciated that the any number of image capture device 204 may be positioned in one position (e.g., at an orientation, height, and/or placement) when the machine learning system is to be trained and any number of image capture device 204 may be in a different position when the machine learning system is trained and is recognizing objects based on trained models.

The image capture device 204 may be placed in any position as long as the objects of interest are in the field of view of the image capture device 204. in some embodiments, placing the image capture device 204 overhead of the object path 208 may greatly reduce or eliminate overlaps of objects in images. This simplifies the process of instance segmentation (e.g., for counting individual objects). Although objects are discussed with regard to FIG. 2A, systems and methods described herein may apply to vegetables, minerals and/or animals such as livestock (e.g., for counting livestock as the animals travel down the path).

The image capture device 204 may provide images or video to the object labeling system 210. In some embodiments, the image capture device 204 utilizes the Real Time Streaming Protocol (RTSP). In various embodiments, the image capture device 204 may provide images to a centralized system over a network. There may be any number of digital devices, each of which have an object labeling system 210 or access to an object labeling system 210, which may retrieve all or part of the images for labeling. The images or video provided to the object labeling system 210 may be utilized to create a labeled dataset. The labeled dataset may be used as training data for the ML model in order to recognize and annotate objects.

There may be any number of image capture device 204. In one example, there is a single image capture device 204. In some embodiments, the image capture device 204 may include or be paired with a LiDAR or other depth sensing device. In one example, the image capture device 204 and the LiDAR may provide images and depth data to the object tracking system 202. Information from the images and depth data may be assessed and/or used as features in the convolution performed by the object tracking system 202.

The information from the LiDAR may be used in conjunction with the image capture device 204 to reduce or eliminate long shadows (e.g., at dusk or dawn), fog, snow, and/or unforeseen conditions influencing creation or changes of bounding boxes/non-rectangular, polygonal shapes or otherwise obscuring objects in the image for identification.

In some embodiments, the use of LiDAR in conjunction with the image capture device 204 may assist to eliminate or reduce the need to take multiple images of objects as they crosses the object path 208. In some embodiments, the image capture device 204 may take multiple images of objects as the objects travel along the object path 208 to track each individual object and to track if there are multiple objects bunched together that may inadvertently be counted as a single object.

The image capture device 204 may have any field of view 206. In various embodiments, the object labeling system 210 may receive video and perform assessments of objects that are captured on video by the image capture device 204 in the field of view 206. It will be appreciated that there may be any number of image capture devices 204 with any number of fields of view 206 that may overlap or extend the view. In some embodiments, the image capture device 204 may include or be local to one or more overhead light sources to illuminate the objects as the objects travel the object path 208.

The object path 208 is any path under or in a field of view of at least one image capture device 204 and that allows inventory to travel from one place to another. In one example described herein, the inventory may be potatoes and the object path 208 may be, for example, a conveyor belt, chute, slide, or any other path.

The object tracking system 202 receives the images and/or stream from the image capture device 204. In various embodiments, the object tracking system 202 utilizes one or more models from region-based convolution neural networks for object identification and counting.

Once the AI models are trained, in various embodiments, the object tracking system 202 may receive images captured by the image capture device 204, selects images received from the image capture device 204, and locates each pixel of every object in the image for instance segmentation (e.g., using Mask R-CNN or any R-CNN process). For each image, the object tracking system 202 may create region proposals, classify the region proposals, and generate segmentation masks to identify specific objects for counting. The object tracking system 202 may provide the count to the client system 212.

Figure 14:
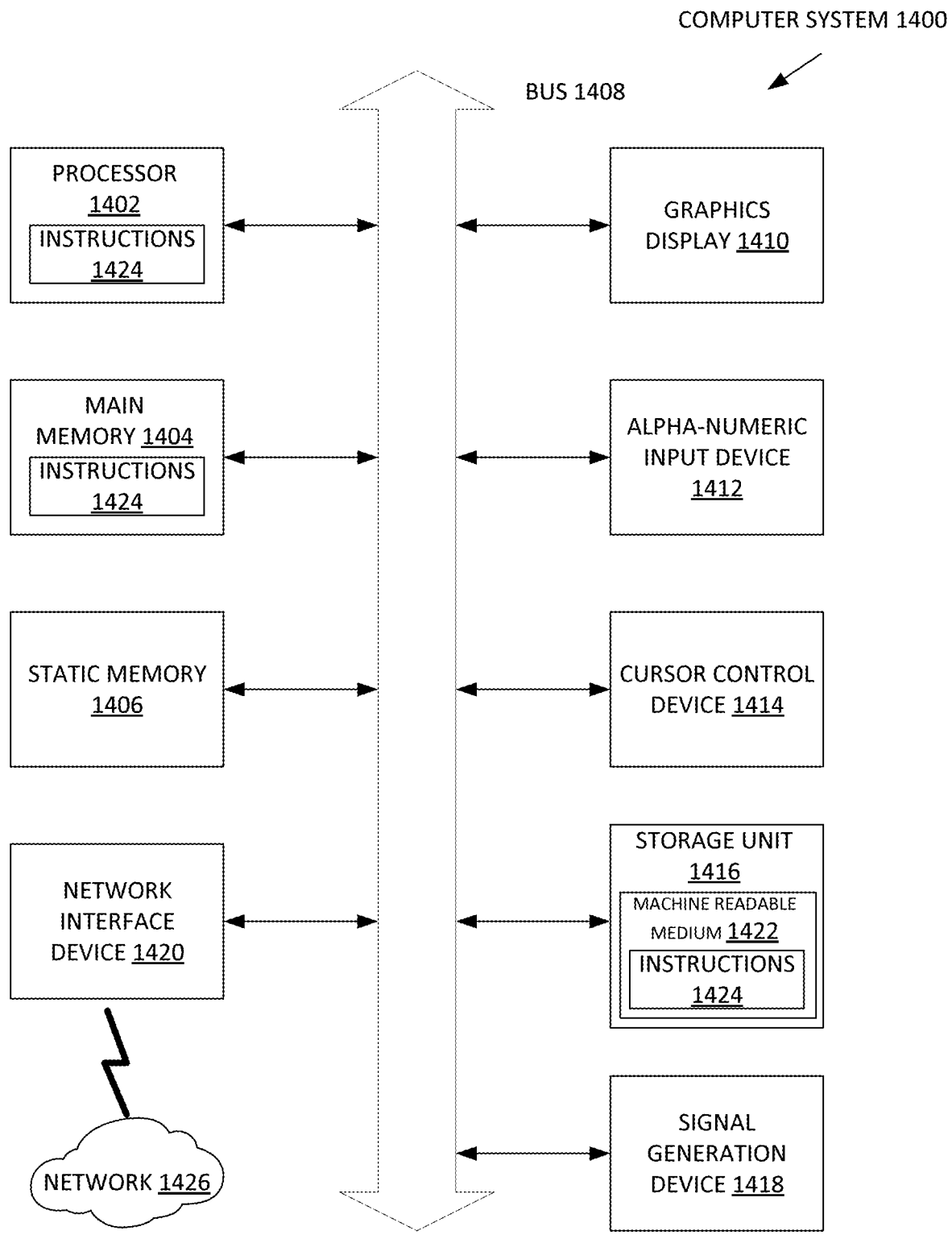
FIG. 14 is a block diagram illustrating a digital device in one example.

The object tracking system 202 and the client system 212 may be digital devices or collections of digital devices. A digital device is any device with at least one processor and memory. Example digital devices include a computer such as a laptop, personal computer, server, terminal, media tablet, smart watch, smart phone, and/or the like. An example of a digital device is depicted in FIG. 14.

The client system 212 may be any digital device. In some embodiments, the client system 212 includes the functionality of the object labeling system 210. In some embodiments, the client system 212 includes the functionality of the object tracking system 202.

In some embodiments, the client system 212 is controlled by a user for assessing and/or receiving a count of inventory that passes over the object path 208. In various embodiments, the client system 212 may communicate directly with the object tracking system 202 and/or the object labeling system 210 over a communication network.

In some embodiments, the client system 212 may communicate with a control system over a communication network to receive or view a count (e.g., the object tracking system 202 may be in communication with the control system over the network as well). The control system may be a digital device or collection of digital devices. The control system may receive information (e.g., images, video, processing, features, counts, or the like) from the object tracking system 202 to assist in providing or calculating an object count for the client system 212. In various embodiments, the control system may provide updates (e.g., new models and/or processing approaches) to any number of remote object tracking system 202 (e.g., the control system may provide support and updating services to any number of remote object tracking system 202 providing counts to any number of different objects for any number of clients). In some embodiments, a user (e.g., a client) may contact the control system or the object tracking system 202 by navigating to a webpage that retrieves or receives the object count from the control system and/or the object tracking system 202.

The object tracking system 202 may identify region proposals in an image, classify the proposals, and generate bounding boxes or non-rectangular, polygonal shapes using a convolutional neural network. The object tracking system 202 is further discussed herein.

Figure 3:
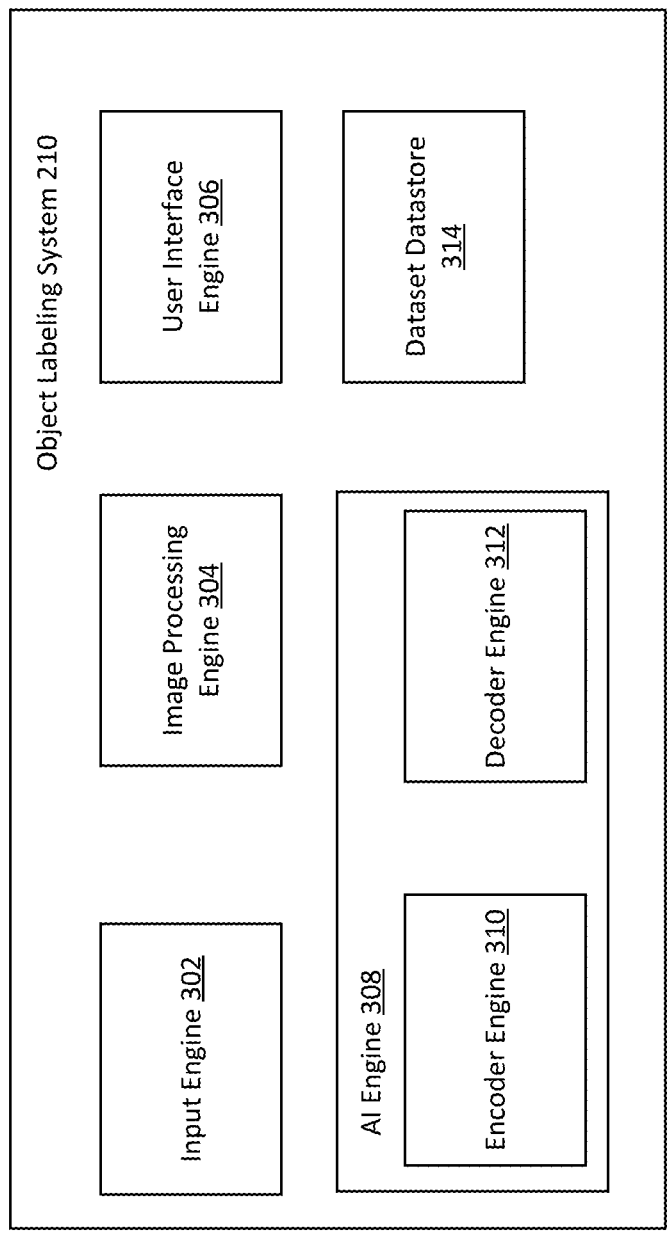
FIG. 3 depicts a block diagram of components of the object labeling system according to some embodiments.

FIG. 3 depicts a block diagram of an example object labeling system 210 according to some embodiments. As discussed herein, the object labeling system 210 may include any number of digital devices. In one example, the object labeling system 210 includes at least one processor, a GPU (e.g., Nvidia 2080), memory, and communication interface configured to receive images and/or streams from the image capture device 204. In some embodiments, the object labeling system 210 is a personal computer that executes software such as object labeling software that performs any number of functions described regarding FIG. 3.

The object labeling system 210 includes an input engine 302, an image processing engine 304, a user interface engine 306, an AI engine 308 including an encoder engine 310 and a decoder engine 312, and a dataset datastore 314. The object labeling system 210, object tracking system 202, and the client system 212 may each be or include any number of digital devices. A digital device is any device with a processor and memory. Digital devices are further discussed herein (e.g., see FIG. 14).

The input engine 302 may be configured to receive and decode images or video received from the image capture device 204. In various embodiments, the input engine 302 takes images or slices of the video for further processing. In various embodiments, the user interface engine 306 may provide an interface to a user. The user interface may enable a user to select one or more of the images or slices to appear in a window to present to the user. The interface may include any number of tools. In one example, one of the tools (e.g., a shape tool) may allow the user to draw a bounding box or bounding shape around an object in the image. For example, the user interface may provide the user with a tool to draw or place a box or any other shape in the image, including, for example, around an object of interest depicted in the image. The user may create bounding shapes around any number of depicted objects in an image.

In some embodiments, one of the tools may allow the user to label, classify, or annotate the image. In some embodiments, the interface may allow the user to command the object labeling system 210 to convert any number of boxes or shapes into polygonal shapes surrounding respective objects in the image (e.g., the polygonal shape may surround an outer boundary of the object in a bounding box).

In various embodiments, the image processing engine 304 may extract or crop each bounding shape and the contents of the bounding shape from the image. If there are two or more bounding shapes that overlap, the image processing engine 304 may crop each bounding shape and the contents of each bounding shape from the image (e.g., there may be duplicate elements from the image in each cropped portion because of the overlap).

The image processing engine 304 may provide the cropped portions to the AI engine 308 to convert each cropped portion to a polygonal shape (e.g., a polygonal lines and/or curves) that surround the outer boundary of the depiction of the object in the respective cropped portion. The polygonal shape may surround the depicted object in the respective cropped portion. In various embodiments, the content of the polygonal shape (e.g., fill) may be a color and/or texture. In one example, the outer boundary of the depicted object in a cropped portion is preserved by the polygonal shape but the details of the depicted object (e.g., color of the object, texture of the object, and other visual features of the object itself) may be covered (e.g., removed) and/or replaced by the color and/or texture.

The AI engine 308 may identify the outer boundaries of depicted objects in the bounding shape and convert the bounding shape to a polygonal shape that surrounds the depicted in object in each cropped portion.

The AI engine 308 may utilize an encoder-decoder structure for semantic segmentation to obtain sharp object boundaries. A polygonal shape or line may then be applied to the boundaries (e.g., contours) of the object and provided back to the user of the object labeling system 210 and/or the object tracking system 202. In some embodiments, the AI engine 308 utilizes the encoder 310 to obtain semantic information by applying atrous convolution and the decoder engine 312 to obtain detailed object boundaries. The user of the encoder 310 and the decoder engine 312 allow for faster computation (e.g., computational efficiency) because features may not be dilated and the resulting object boundaries may be recovered.

Features are often dilated in the prior art because detailed information related to object boundaries is missing due to the pooling or convolutions with striding operations within the network backbone. Atrous convolution can be applied to extract denser feature maps. However, it may computationally prohibitive to extract output feature maps Atrous convolution allows control the resolution of features computed by deep convolutional neural networks and adjust filter's field-of-view in order to capture multi-scale information. In the case of two-dimensional signals, for each location i on the output feature map y and a convolution filter w, atrous convolution may be applied over the input feature map x as follows:

$$y[i] = \sum_k x[i + r \cdot k]w[k] \quad (1)$$

where the atrous rate r determines the stride of the sampling of the input signal. The filter's field-of-view may be adaptively modified by changing the rate value.

The AI engine 308 may decompose a standard convolution into a depthwise convolution (applying a single filter for each input channel) and a pointwise convolution (combining the outputs from depthwise convolution across channels). The AI engine 308 may utilize an atrous separable convolution.

The AI engine 308 may reduce computation complexity by factorizing a standard convolution into a depthwise convolution followed by a point-wise convolution (i.e., 1×1 convolution). In some embodiments, the depthwise convolution may perform a spatial convolution independently for each input channel, while the pointwise convolution is employed to combine the output from the depthwise convolution. The resulting convolution may be an atrous separable convolution.

In various embodiments, the dataset datastore 314 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The dataset datastore 314 may store stream from the image capture device 204 and/or the selected images used for processing by the image processing engine 304. The dataset datastore 314 may also store the segmentation masks/non-rectangular, polygonal shapes identified in different images and track which shapes are associated with different animals. The dataset datastore 314 may track the stream, images, processed images, counts, and the like for any number of different livestock counting events from any number of image capture devices 104 over any number of different inventory paths.

Figure 4:
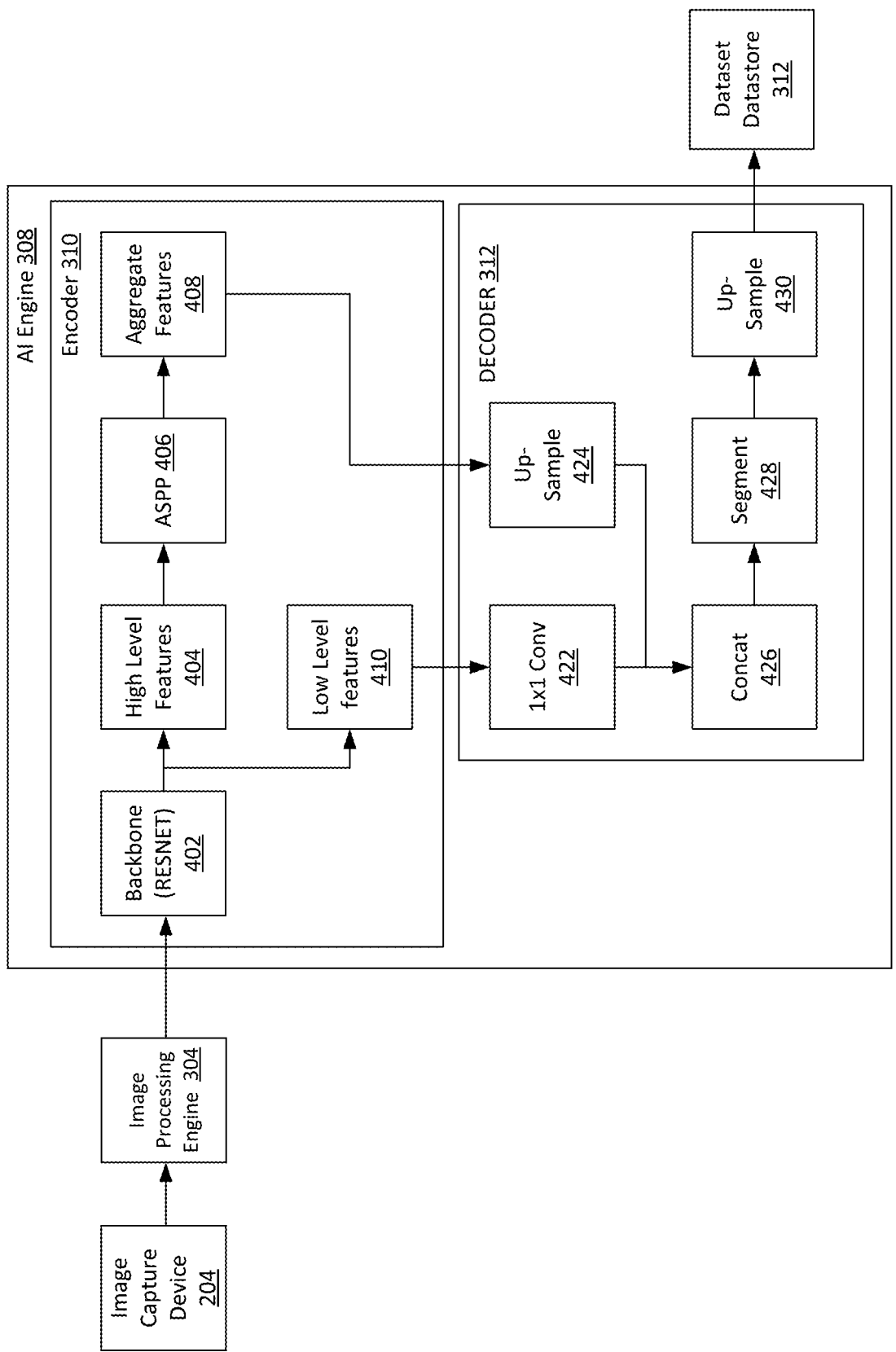
FIG. 4 depicts high level features of an Atrous Spatial Pyramid Pooling (ASPP) according to some embodiments.

FIG. 4 depicts an environment of the AI engine 308 in some embodiments. The AI engine 308 may include the encoder 310 and the decoder 312. The encoder may include or have access to the backbone 402, high level features 404, ASPP 406, aggregate features 408, and low-level features 410. The decoder 312 may include a 1×1 convolution 422, an up-sample 424, a concatenation 426, a segmentation 428, and an up-sample 430.

Regarding the network backbone 402, a multi-layered residual neural network may be employed (e.g., ResNet or ResNet-101). The network backbone 402 may utilize non-linearities (ReLU) and batch normalization between layers. The network backbone 402 may implement a weight matrix to skip layers.

The network backbone 402 (e.g., ResNet) may extract features from one or more frames of images. In some embodiments, the network backbone 402 may extract high-level features 404 and low-level features 410. Examples of high-level features 404 may be generated by the last few convolutional layers of the network backbone 402 and may include, for example:
  Low spatial information content
  High semantic/scene information content Examples of low-level features 410 may be generated by the first few convolutional layers of the network backbone 402 and may include, for example:
  High spatial information content
  Low semantic/scene information content High- and low-level image features may serve different conceptual purposes. For example, high-level features 404 may indicate what objects are present in an image or the box of an image, and low-level features 410 may indicate where those objects are in the image or in the box of the image.

Atrous Spatial Pyramid Pooling (ASPP) 406 may enable further processing of the high-level features. The ASPP 406 may be utilized to probe an incoming convolutional feature layer with filters at multiple sampling rates and effective fields-of-views to capturing objects as well as image context at multiple scales. For example, the ASPP 406 may receive an input feature map (e.g., the high-level features) and then apply convolutional layers in parallel at different rates on the input feature map (e.g., apply, in parallel, Cony 1×1, Cony 3×3 rate 6, Cony 3×3 rate 12, and Cony 3×3 rate 18). The ASPP 406 may concatenate the features from the different layers and apply a Cony 1×1 (in any order) to get the aggregate features 408. In some embodiments, the ASPP 406 may be applied for batch normalization and/or image-level features (e.g., image pooling) (and may not, in some embodiments, use conditional random fields). In some embodiments, the encoder output feature map may contain 256 channels and semantic information.

The ASPP 406 may further aggregate contextual information from across the frame. The atrous convolution may extract features computed by deep convolutional neural networks at an arbitrary resolution. The output stride may be the ratio of input image spatial resolution to the final output resolution (before global pooling or fully-connected layer). In one example, for the task of image classification, the spatial resolution of the final feature maps is 32 times smaller than the input image resolution and thus output stride=32. For the task of semantic segmentation, the output stride=16 (or 8) for denser feature extraction may be used by removing the striding in the last one (or two) block(s) and applying the atrous convolution correspondingly (e.g., applying a rate=2 and rate=4 to the last two blocks respectively for output stride=8).

Figure 5:
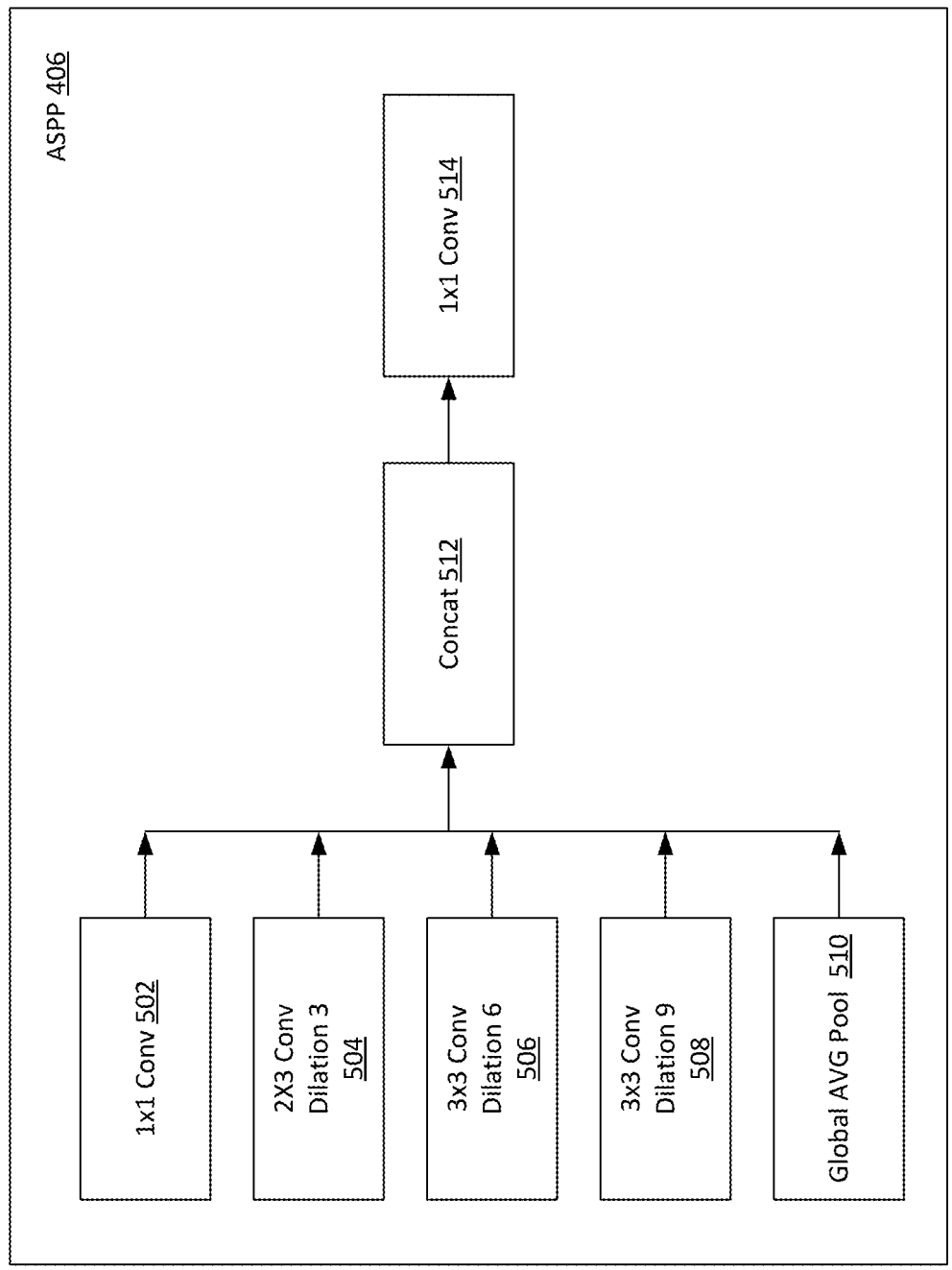
FIG. 5 depict high level features of a component of the object labeling system according to some embodiments.

FIG. 5 depicts an example ASPP 406 in some embodiments. In this example, the ASPP 406 receives the high-level features 404 of the frame(s). The ASPP 406 may apply, in parallel, to the high-level features 404 a 1×1 convolutional layer 502, a 2×3 convolutional layer with a dilation of 3 504, a 3×3 convolutional layer with a dilation of 3 506, a 3×3 convolutional layer with a dilation of 3 508, and a global AVG pool 510. The output may be concatenated and the output of the concatenation 512 may be applied to a 1×1 convolution layer which may, in some embodiments, provide an actual size of the image which may be a segmented mask.

The encoder 310 features may be computed with any output stride (e.g., output stride=16). The decoder 132 may apply an up-sampler 424 to bilinearly up-sample the aggregate features 408 (e.g., by a factor of 4). The decoder 132 may apply another 1×1 convolution 422 on the low-level features 410 to reduce the number of channels, since the corresponding low-level features usually contain a large number of channels (e.g., 256 or 512) which may outweigh the importance of the rich encoder features (only 256 channels).

The decoder engine 312 may concatenates 426 the features of the corresponding low-level features 410 from the network backbone 402 (e.g., resnet) that have the same spatial resolution (e.g., Conv2 before striding in the network backbone).

Figure 6:
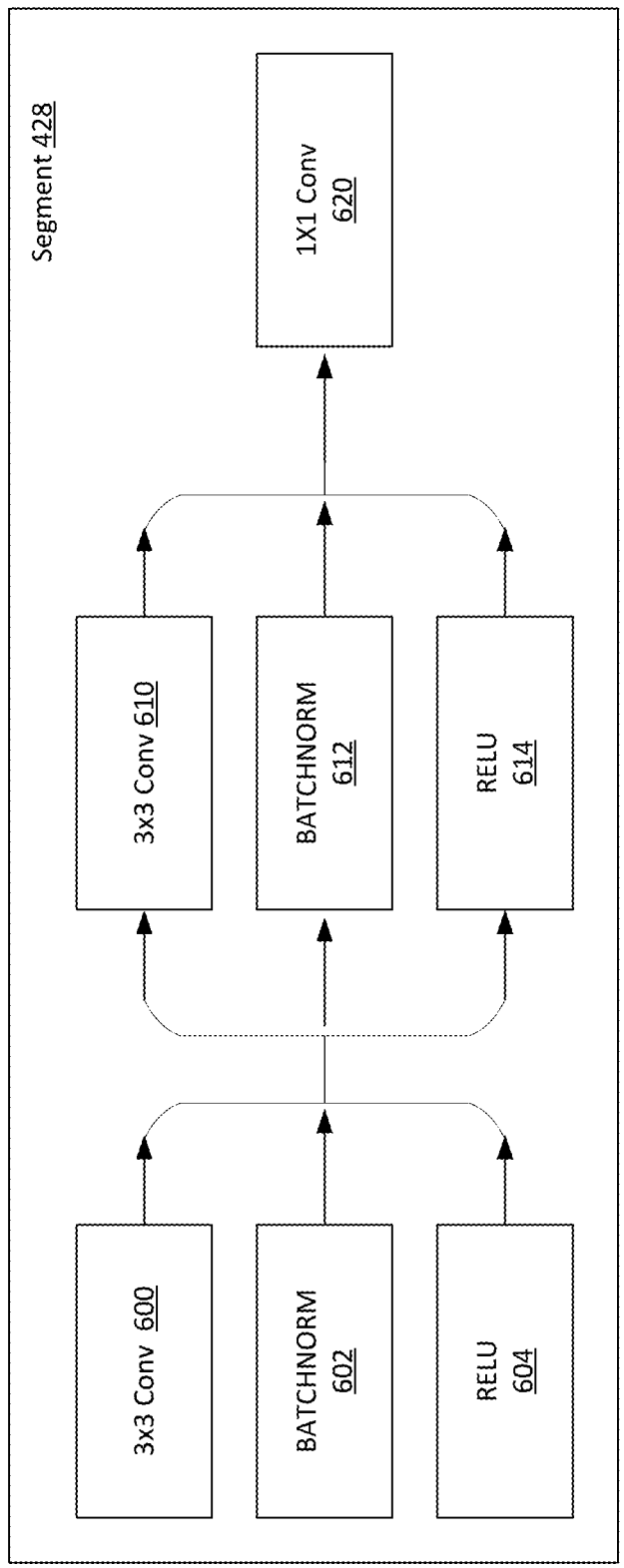
FIG. 6 depicts a segmentation component of the AI engine according to some embodiments.

After the concatenation, the decoder 132 may apply segmentation 428. FIG. 6 depicts a segmentation 428 in some embodiments. The segmentation 428 may perform segmentation. In one example, segmentation 428 may be applied to any number of convolutions (e.g., 3×3 convolutions) 600 and 610 to refine the features. The segmentation 428 may apply batch normalization 602 and 612. Batch normalization includes a normalization step that fixes means and variances of each layer's inputs. The segmentation 428 may also apply a ReLU (rectified linear unit) 604 and 614. The RELU is short for a piecewise linear function that may output the input directly if positive and zero if otherwise. A 1×1 convolution 620 is applied thereafter.

The decoder 132 may subsequently apply another up-sampler 430 to perform another simple bilinear upsampling (e.g., by a factor of 4). The output of the upsample is the prediction which, in this case, identifies the contours around the image of interest. The AI engine 308 may apply a line and/or polygonal shape along the contours of the object.

The image of the object and the polygonal shape of the object may be stored in the decoder engine 312. In various embodiments, only the object depicted in the image is stored in the decoder engine 312. In some embodiments, the object and the surrounding polygonal shape is stored in decoder engine 312. In various embodiments, the image capture device 204 may display the original image, remove the box drawn by the user, and display the polygonal shape around the object. The image capture device 204 may allow the user to save the object, annotate the object, label the object, classify the object, and the like. The image, image of the object, annotations, labels, classifications, or any combination may be stored in the decoder engine 312.

In some embodiments, an Xception model is applied. For example, in some embodiments, all max pooling operations are replaced by depthwise separable convolution with striding, which enables application of atrous separable convolution to extract feature maps at an arbitrary resolution (another option is to extend the atrous algorithm to max pooling operations), and extra batch normalization and ReLU activation are added after each 3×3 depthwise convolution (in this example, the segmentation 428 may be applied to the Xception model).

Returning to FIG. 1A, the interface 100 depicts an image displayed by a user. In this example, the image depicts a person playing tennis. An image may be uploaded to the object labeling system 210 to prepare objects that will later be a part of training data (e.g., for the object counting system object tracking system 202). The area 110 represents a digital image uploaded to the object labeling system 210. The user may interact with the user interface 600 by drawing or placing a square or rectangle around an object in the area 110 that encloses the object. For example, the user may annotate a person playing tennis that is part of the digital image with two mouse clicks at areas 112 and 114 to form a rectangle (or, alternately draw a rectangle or expand a box around the object of interest). In the illustrated embodiment, the rectangle is an input to the object labeling system 210. In one embodiment, the input of the object labeling system 210 is a circle, a line, or some other shape.

Figure 1B:
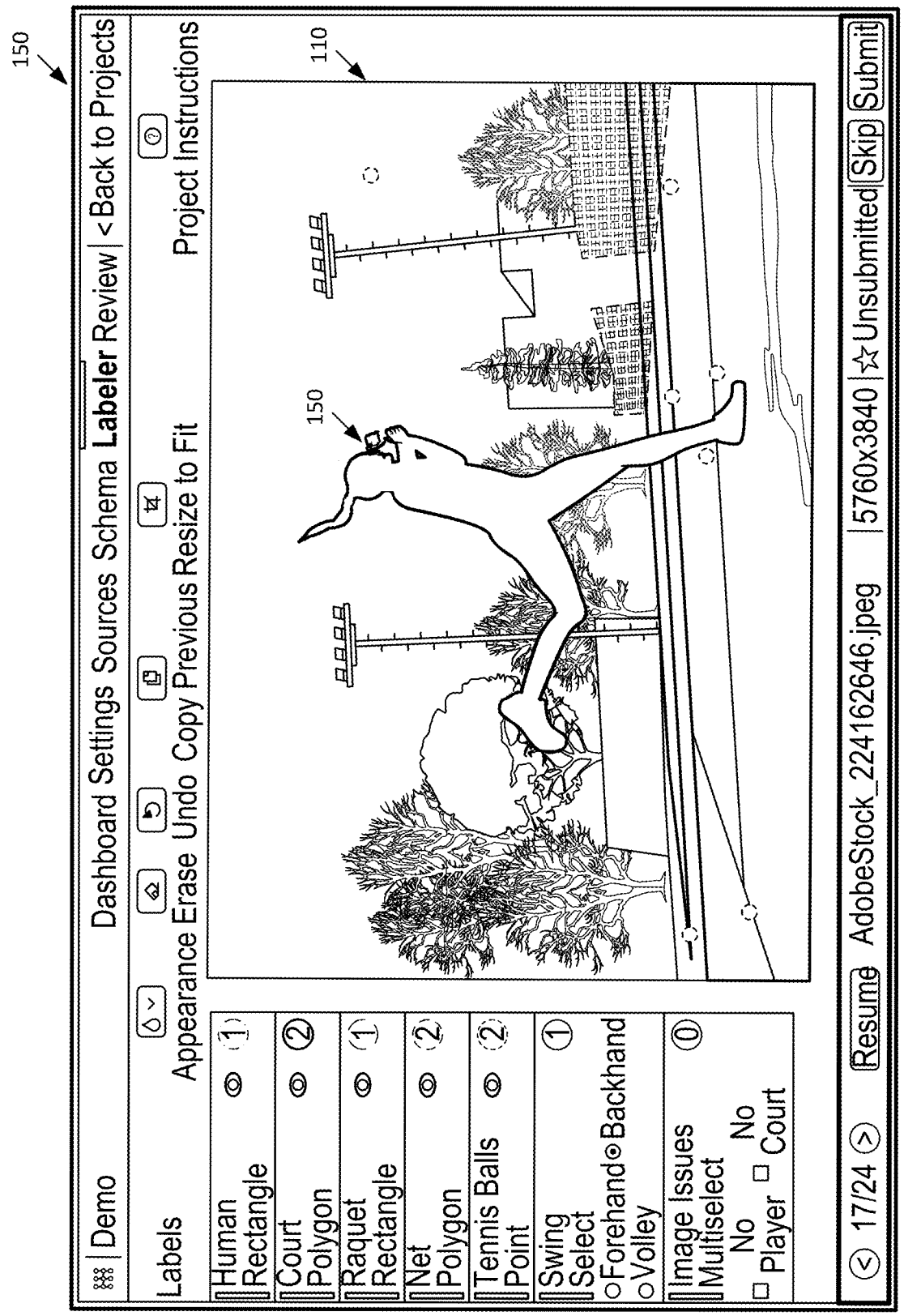
FIG. 1B depicts an example user interface for an object labeling system in some embodiments, the picture depicts an example polygonal shape image of a selected tennis player in this example.

The object labeling system 210 may receive the digital image along with the cartesian coordinates of vertices of the rectangles and the provides the selected portion of the image to the AI engine 308. Using the encoder 310 and the decoder engine 312, the AI engine 308 may identify the tennis player and/or the racket as well as the contours around either object or both. The AI engine 308 and/or the image processing engine 304 may provide a polygonal shape around the tennis player and/or the racket. The interface may display the original image as well as the polygonal shape around the objects of interest. In some embodiments, the AI engine 308 and/or the image processing engine 304 may provide the polygonal shape surrounding the object of interest and the object of interest (e.g., the internal region of the polygonal shape) may be blank 150 or colored as depicted in FIG. 1B. FIG. 1B depicts an outline of the tennis player surrounded by the polygonal shape. In some embodiments, the object labeling system 210 may provide the image of the tennis player or the polygonal shape (without the image of the tennis player) to the object tracking system 202. Any number of images of the contents of the polygonal shape or the shape of the boundaries for the tennis player to the object tracking system 202 for training.

FIG. 7 depicts the image through an example process as discussed herein. In various embodiments, the object labeling system 210 receives an image uploaded by a user. The image, in this example, depicts a person with sheep and a dog. A user may draw boxes around each object of interest to create object localization. In this example, the user draws boxes around each sheep, a box around the person, and a box around the dog. The user may provide a command to convert the boxes to a polygonal shape that surrounds each object within the respective box (e.g., each sheep, person, and dog in a box). The object labeling system 210 may receive the image and/or boxes and the AI engine 308 and/or image processing engine 304 may provide the outlines of the boundaries of each object as semantic segmentation. The image and/or the outlines of each object may be returned.

Figure 8:
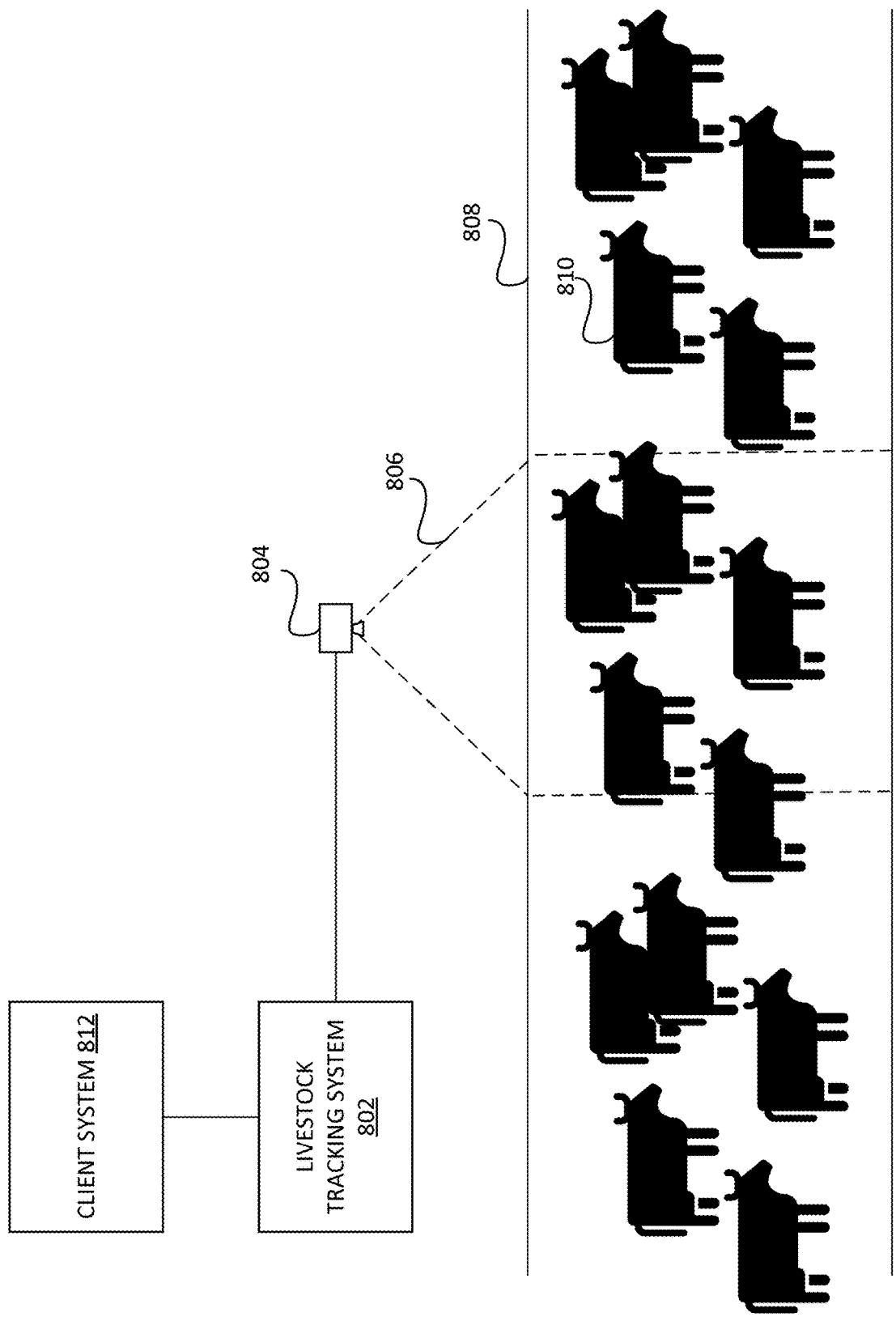
FIG. 8 depicts a block diagram of an example environment capable of counting and inventorying livestock according to some embodiments.

FIG. 8 depicts a block diagram of an example environment 800 capable of counting and inventorying livestock according to some embodiments. The example environment includes a livestock tracking system 802, an image capture device 804 with a field of view 806, a livestock path 808, livestock 810, and a client system 812.

The image capture device 804 may be any capture device, including, for example, a camera. In various embodiments, the image capture device 804 may be positioned over the livestock path 808. In some embodiments, the image capture device 804 may be or include any number of cameras capable of taking images or video as the livestock path over the livestock path 808. In some embodiments, the image capture device 804 is positioned 8-10 feet overhead of the ground of the livestock path 808. It may be appreciated that the image capture device 804 may be positioned at any position over the livestock path 808. In different embodiments, the image capture device 804 may be positioned in front of the livestock, below the livestock, from behind the livestock, at any angle, or the like.

Placing the image capture device 804 overhead of the livestock path 808 may greatly reduces or eliminate overlaps of livestock in images. This simplifies the process of instance segmentation (e.g., for counting individual animals).

The image capture device 804 may provide images or video to the livestock tracking system 802. In some embodiments, the image capture device 804 utilizes the Real Time Streaming Protocol (RTSP).

There may be any number of image capture devices 804. In one example, there is a single image capture device 804. In some embodiments, the image capture device 804 may include or be paired with a LiDAR or other depth sensing device. In one example, the image capture device 804 and the LiDAR may provide images and depth data to the livestock tracking system 802. Information from the images and depth data may be assessed and/or used as features in the convolution performed by the livestock tracking system 802.

In some embodiments, the LiDAR may be utilized to reduce or eliminate the risk of counting a box (e.g., bounding box or non-rectangular, polygonal shape) or segmentation mask as a single animal when, in reality, there may be multiple animals close together (e.g., thereby enabling the system to identify multiple animals and/or draw non-rectangular, polygonal shapes around each animal even if close together). The information from the LiDAR may be used in conjunction with the image capture device 804 to detect multiple animals that are close together as separate animals. Models may be trained using features from the combination of image features and features of the depth information. The models may subsequently be used to assist with object detection, classification, and/or regression based on images received from the image capture device 804 and LiDAR.

The information from the LiDAR may be used in conjunction with the image capture device 804 to reduce or eliminate long shadows (e.g., at dusk or dawn), fog, snow, and/or unforeseen conditions influencing creation or changes of bounding boxes/non-rectangular, polygonal shapes or otherwise obscuring animals in the image for identification.

In some embodiments, the use of LiDAR in conjunction with the image capture device 804 may assist to eliminate or reduce the need to take multiple images of livestock as it crosses the livestock path. In some embodiments, the image capture device 804 may take multiple images of livestock as the animals cross the livestock path 808 to track each individual animal and to track if there are multiple animals bunched together that may inadvertently be counted as a single animal.

The image capture device 804 may have any field of view 806. In various embodiments, the livestock tracking system 802 may receive video and perform assessments of livestock that are captured on video by the image capture device 804 in the field of view 806. It will be appreciated that there may be any number of image capture devices 804 with any number of fields of view 806 that may overlap or extend the view. In some embodiments, the image capture device 804 may include or be local to one or more overhead light sources to illuminate the livestock as the livestock travel the livestock path 808.

The livestock path 808 is any path under or in a field of view of at least one image capture device 804 and that allows livestock to travel from one place to another. In one example described herein, the livestock may be cattle and the livestock path 808 may be immediately in front of a chute or any other path. In some embodiments, the livestock path may be along a path that livestock travel before or after weight measurement (e.g., before or after a scale).

Livestock 810 may include any number and type of animals. Many examples described herein will focus on cattle and pigs as examples of livestock for counting. It will be appreciated that these are examples, and that systems or methods described herein may be used for many different types of livestock such as sheep, goats, chickens, turkeys, or the like. Further, while a single type of livestock is being counted in these examples (e.g., cattle are counted as they travel over a livestock path), it will be appreciated that mixed animals may also be separately counted (e.g., sheep and dogs). In one example, different genders of animals may be separately counted (e.g., cows may be counted separately from bulls).

In further examples, animals of a specific quality may be separately counted. For example, cows that appear wounded or ill may be identified from the images and counted separately from otherwise healthy animals. Similarly, cows that appear pregnant or ready for market may be detected from the images and counted separately. By using instance segmentation, each animal may be identified from an image and separately assessed. In another example, the livestock tracking system 802 may track a total of all animals of a particular type (e.g., cattle) as well as subtotals of animals of a certain quality (e.g., separate counts of cows, bulls, pregnant cows, and unhealthy cows)

The livestock tracking system 802 receives the images and/or stream from the image capture device 804. In various embodiments, the livestock tracking system 802 utilizes one or more models from region-based convolution neural networks for livestock identification and counting.

In various embodiments, the livestock tracking system 802 selects images received from the image capture device 804 (e.g., from video), and locates each pixel of every object in the image for instance segmentation (e.g., using Mask R-CNN or any R-CNN process). For each image, the livestock tracking system 802 may create region proposals, classify the region proposals, and generate segmentation masks to identify specific animals for counting. The livestock tracking system 802 may provide the count to the client system 812.

The livestock tracking system 802 and the client system 812 may be digital devices or collections of digital devices. A digital device is any device with at least one processor and memory. Example digital devices include a computer such as a laptop, personal computer, server, terminal, media tablet, smart watch, smart phone, and/or the like.

The client system 812 may be any digital device controlled by a user for assessing and/or receiving a count of livestock 810 that passes over the livestock path 808. In various embodiments, the client system 812 may communicate directly with the livestock tracking system 802 or over a communication network. In some embodiments, the client system 812 may communicate with a control system over a communication network to receive or view a count (e.g., the livestock tracking system 802 may be in communication with the control system over the network as well). The control system may be a digital device or collection of digital devices.

The control system may receive information (e.g., images, video, processing, features, counts, or the like) from the livestock tracking system 802 to assist in providing or calculating a livestock count for the client system 812. In various embodiments, the control system may provide updates (e.g., new models and/or processing approaches) to any number of remote livestock tracking systems 802 (e.g., the control system may provide support and updating services to any number of remote livestock tracking systems 802 providing counts to any number of different livestock for any number of clients). In some embodiments, a user (e.g., a client) may contact the control system or the livestock tracking system 802 by navigating to a webpage that retrieves or receives the livestock count from the control system and/or the livestock tracking system 802.

The livestock tracking system 802 may identify region proposals in an image, classify the proposals, and generate bounding boxes or non-rectangular, polygonal shapes using a convolutional neural network. The livestock tracking system 802 may utilize a backbone network (e.g., a standard CNN). Earlier layers may detect low-level features while later features detect high-level features. A Feature Pyramid Network (FPN) is an extension of the backbone network which may represent objects at multiple scales. The FPN may include two pyramids where the second pyramid receives the high-level features from the first pyramid and passes them to the lower layers. This allows every level to have access to both lower and higher-level features.

The livestock tracking system 802 may utilize a Region Proposal Network (RPN) to scan the FPNs and propose regions which may contain objects. The livestock tracking system 802 may utilize a set of boxes or non-rectangular, polygonal shapes (e.g., anchors) with defined locations and scales according to the input images. Individual sets of boxes or non-rectangular, polygonal shapes may be assigned classes. The RPN, in this example, may generate two outputs for each set of boxes or non-rectangular, polygonal shapes, including, for example, anchor class and bounding box/non-rectangular, polygonal shapes specifications. The anchor class may be either a foreground class or a background class.

The livestock tracking system 802 may utilize RoIAlign for convolutions in which a feature map is sampled at different points and then a bilinear interpolation is applied to get a precise idea of what would be at each pixel.

The livestock tracking system 802 then may utilize a convolutional network to take the regions selected by the ROI classifier (e.g., any number of support vector machines (SVMs)) and generate segmentation masks.

The classifier may be any number of support vector machines (SVMs). The SVM may differentiate any number of classes using support vectors. In one example, SVMs may be trained on multivariate data and may project input data into a higher dimensional reference space (e.g., a reference space with more dimensions than that of the received data). The SVMs may be trained to identify extremes of class differentiation and utilize linear vectors within the high-dimensional reference space to differentiate classes and images. In some embodiments, parameters may be projected using a kernel function that is trained using k-fold cross-validation.

In some embodiments, the livestock tracking system 802 may utilize a linear regression once an object has been classified to generate tighter binding box coordinates.

Figure 9:
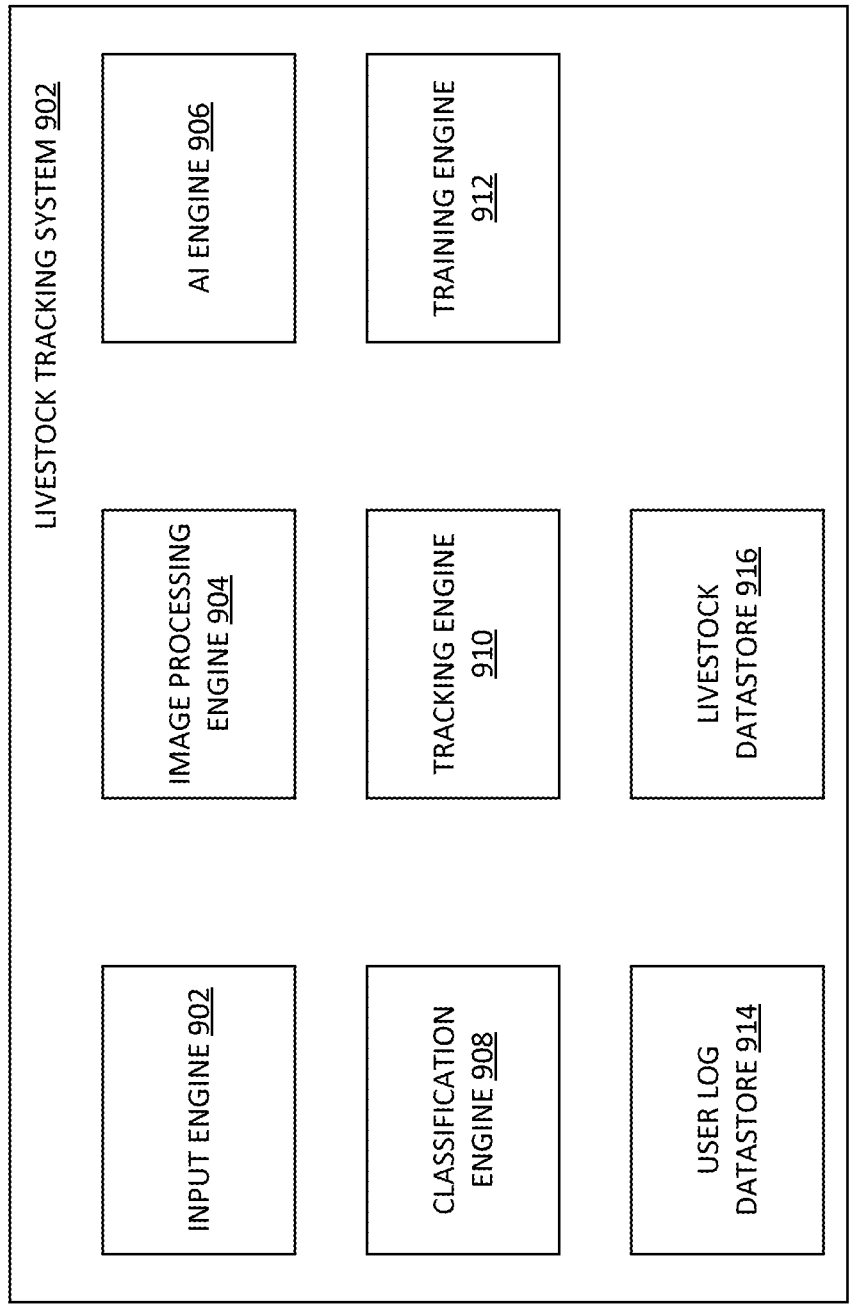
FIG. 9 depicts a block diagram of an example livestock tracking system according to some embodiments.

FIG. 9 depicts a block diagram of an example livestock tracking system 802 according to some embodiments. As discussed herein, the livestock tracking system 802 may include any number of digital devices. In one example, the livestock tracking system 802 includes at least one processor, a GPU (e.g., Nvidia 9080), memory, and communication interface configured to receive images and/or streams from the image capture device 804.

The livestock tracking system 802 includes an input engine 902, an image processing engine 904, an artificial intelligence (AI) engine 906, a classification engine 908, a user log datastore 914, and a livestock datastore 916. The livestock tracking system 802 and the client system 812 may each be or include any number of digital devices.

The input engine 902 may be configured to receive and decode video received from the image capture device 804. In various embodiments, the input engine 902 takes images or slices of the video for further processing. The input engine 902 may select any number of the images (e.g., periodically select images) for processing by the image processing engine 904.

In various embodiments, the image processing engine 904 may receive the image from the input engine 902. The image processing engine 904 may assess the image to identify objects and/or regions of interest (RoI) using a region proposal network (RPN) and score potential bounding boxes or non-rectangular, polygonal shapes (e.g., using a cls layer for scores and a reg layer for coordinates). The AI engine 906 may classify objects within the bounding boxes or non-rectangular, polygonal shapes using any number of SVMs. The AI engine 906 may create segmentation masks and/or identify different livestock associated with the different segmentation masks. Subsequently, the animals may be counted.

In some embodiments, the livestock tracking system 802 tracks animals across multiple images as the animals travel the livestock path 808 before concluding the animal count (e.g., to prevent a single animal being counted when the segmentation mask contains multiple animals in the image).

The AI engine 906 may apply any number of models to assist in proposing regions of interest, scoring RoIs, object classification, creating segmentation masks, and/or identifying different livestock within the image. For example, the AI engine 906 may utilize models to create segmentation masks associated with qualifying regions of interest (using a CNN).

In some embodiments, the AI engine 906 may utilize models to create segmentation masks (e.g., associated with boxes or non-rectangular, polygonal shapes) within an image as individual livestock. The AI engine 906 may also use segmentation mask criteria to assist in limiting the objects of interest in the image. The segmentation mask criteria may identify characteristics of an RoI, bounding box, or non-rectangular, polygonal shape that are required to be satisfied in order for the object to be livestock to be counted. The segmentation mask criteria may include, for example, a range of sizes. In another example, the segmentation mask criteria may include a range of shapes. The method is further discussed herein.

The AI engine 906 may utilize models to create segmentation masks, to label or categorize objects in regions as livestock, or both.

The classification engine 908 may be configured to identify livestock associated with segmentation masks. The classification engine 908 may utilize models to identify livestock associated with the segmentation mask. The classification engine 908 may be configured to identify the objects that also satisfy the segmentation mask criteria. In various embodiments, the classification engine 908 identifies each object within different RoIs and/or segmentation masks as different animals.

The tracking engine 910 may count livestock based on the animal identification by the classification engine 908. The tracking engine 910 may also track the same animal in multiple images as the animal travels across the image capture device 804 field-of-view (e.g., as the animal crosses the livestock path 808). If animals overlap or are too close together, the tracking engine 910 may track the animals across the livestock path 808 in order to determine if the animals spread apart (e.g., thereby creating multiple segmentation masks for different animals as the animals travel down the livestock path 808). The tracking engine 910 may then count the animals in the image(s).

For example, two more cows may be bunched closely together as they emerge onto the livestock path 808. The initial image from the image capture device 804 may capture the cows being very close together. The image processing engine 904 may create a segmentation mask or enclosed shape that surrounds two or more cows. The AI engine 906 or the classification engine 908 may not recognize the segmentation mask as being an animal or may indicate that the segmentation mask is a single animal. The livestock tracking system 802 may receive any number of images as the same cows travel along the livestock path 808 within the field-of-view 806. As a result, the tracking engine 910 may utilize multiple images of the same animals to assist in identifying individual cows as they move and spread apart from each other. As such, the tracking engine 910 may identify a larger, single non-rectangular, polygonal shape surrounding two or more animals in an earlier image and then identify multiple cows as they travel down the livestock path 808 in later images.

It may be appreciated that classification of a single type of animal, such as cows, simplifies the categorization process because there are not a large number of different classes that may apply.

The training engine 912 may utilize at least a portion of a training set of images and/or segmentation masks to train the AI modeling system to assist in identifying regions of interest within the image as being livestock for creating segmentation masks and/or categorize segmentation masks (e.g., non-rectangular, polygonal boxes) as livestock. The training engagement may utilize another portion of the training set to test to results of the AI modeling system.

The training engine 912 may utilize the object labeling system 210 to create a training set. The training set may be used to train a network such as the extractor (of regions), classifier, and the regressor for improved fitting of bounding boxes/non-rectangular, polygonal shapes to objects. The object labeling system 210 may include an interface that enables users to draw shapes (e.g., non-rectangular, polygonal shapes or rectangular boxes) and/or label the shapes (e.g., categorize) in an image. For example, users may draw shapes (e.g., non-rectangular, polygonal shapes) around livestock and/or label non-rectangular, polygonal shapes of an image as being livestock.

In some embodiments, livestock may travel over the livestock path 808 and the image capture device 804 may provide a stream of video to the input engine 902. The input engine 902 may decode the stream and take slices of video at predetermined intervals. The image processing engine 904 may identify regions of interest and the AI engine 906 may utilize non-rectangular, polygonal shapes or bounding boxes. The non-rectangular, polygonal shapes within the images may be identified as specific livestock (e.g., a first cow, and another non-rectangular, polygon as being a second cow, and so forth). The identification may be performed manually and/or using the object labeling system 210 to create a training set for model creation.

The training set may be used to train the AI system. A loss function may be the combination of the class and intersection over union of the guess of the AI engine 906. The loss function may utilize a gradient descent.

In some embodiments, the AI engine 906 may be capable of tracking animals even in close quarters. For example, in some images, two livestock (e.g., two cows) may be close together. The AI engine 906 may initially create a non-rectangular, polygonal shapes that captures both animals. By training the model, the AI engine 906 may create non-rectangular, polygonal shapes around each animal separately or disregard an irregularly shaped non-rectangular, polygonal shape that does not match or fit within a segmentation mask criteria.

Further, in some embodiments, the AI engine 906 may receive additional images from the image capture device 804 and detect when the animals separate along the livestock path. The AI engine 906 may generate two non-rectangular, polygonal shapes, one for each animal, and track the animals. As a result, through the segmentation mask criteria and/or taking multiple images along a livestock path, animals may be identified and counted.

The segmentation mask criteria may include any kind of criteria that assists in the identification of a shape as being a particular animal. In some embodiments, the livestock tracking system 802 may be configured to track cows as they emerge from a cow chute. The image capture device 804 may be positioned over the livestock path. The segmentation mask criteria may include criteria that fit an expected non-rectangular, polygonal shape for the size and general shape of a cow. If the livestock are all the same animal of the same age range, the segmentation mask criteria can define non-rectangular, polygonal shapes of expected sizes and shapes. If a non-rectangular, polygonal shape of an object in an image does not fit the segmentation mask criteria, the livestock tracking system 802 may flag the object in future images to determine if the non-rectangular, polygonal shape in the image changes (e.g., separates to any number of non-rectangular, polygonal shapes that fit the segmentation mask criteria). If a dog or person walks across the livestock path for example, the livestock tracking system 802 may not count the image of the dog or person because their shapes do not fit the segmentation mask criteria.

In some embodiments, the AI engine 906 may identify regions of interest of an image based on one or more models. The region of interest (RoI) may include qualities that make it a proposed region of interest based on qualities that satisfy a selection criteria, score, segmentation mask criteria and/or any number of models. The AI engine 906 may identify regions using non-rectangular, polygonal shapes and/or draw non-rectangular, polygonal shapes around qualifying proposed regions of interest based on the selection criteria, score, segmentation mask criteria and/or any number of models. Similarly, in some embodiments, the AI engine 906 may categorize or otherwise label objects in or associated with RoIs as livestock based on any criteria including or not including the segmentation mask criteria and/or any number of models.

In one embodiment, the user log datastore 914 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The user log datastore 914 may store authentication information and user information regarding different users who interact with the livestock tracking system 802 or access livestock counts. The user log data store 914 may also track what information is provided to each user at what time (e.g., video, animal counts, location information, conditions, and/or the like).

In various embodiments, the livestock datastore 916 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The livestock datastore 916 may store stream from the image capture device 804 and/or the selected images used for processing by the image processing engine 904. The livestock datastore 916 may also store the segmentation masks/non-rectangular, polygonal shapes identified in different images and track which shapes are associated with different animals. The livestock datastore 916 may track the stream, images, processed images, counts, and the like for any number of different livestock counting events from any number of image capture devices 804 over any number of different livestock paths.

It will be appreciated that utilizing the livestock tracking system 802 as discussed herein may greatly reduce errors in manually counting. Further, counting may be performed without distractions and recounts, if any, do not need to be manual. Rather, in some embodiments, video can be reviewed to confirm livestock counts and AI effectiveness when pre-count and automated counts do not match. Further, employees (e.g., livestock handlers and drivers) may stay warm as the need to go outside decreases.

Figure 10:
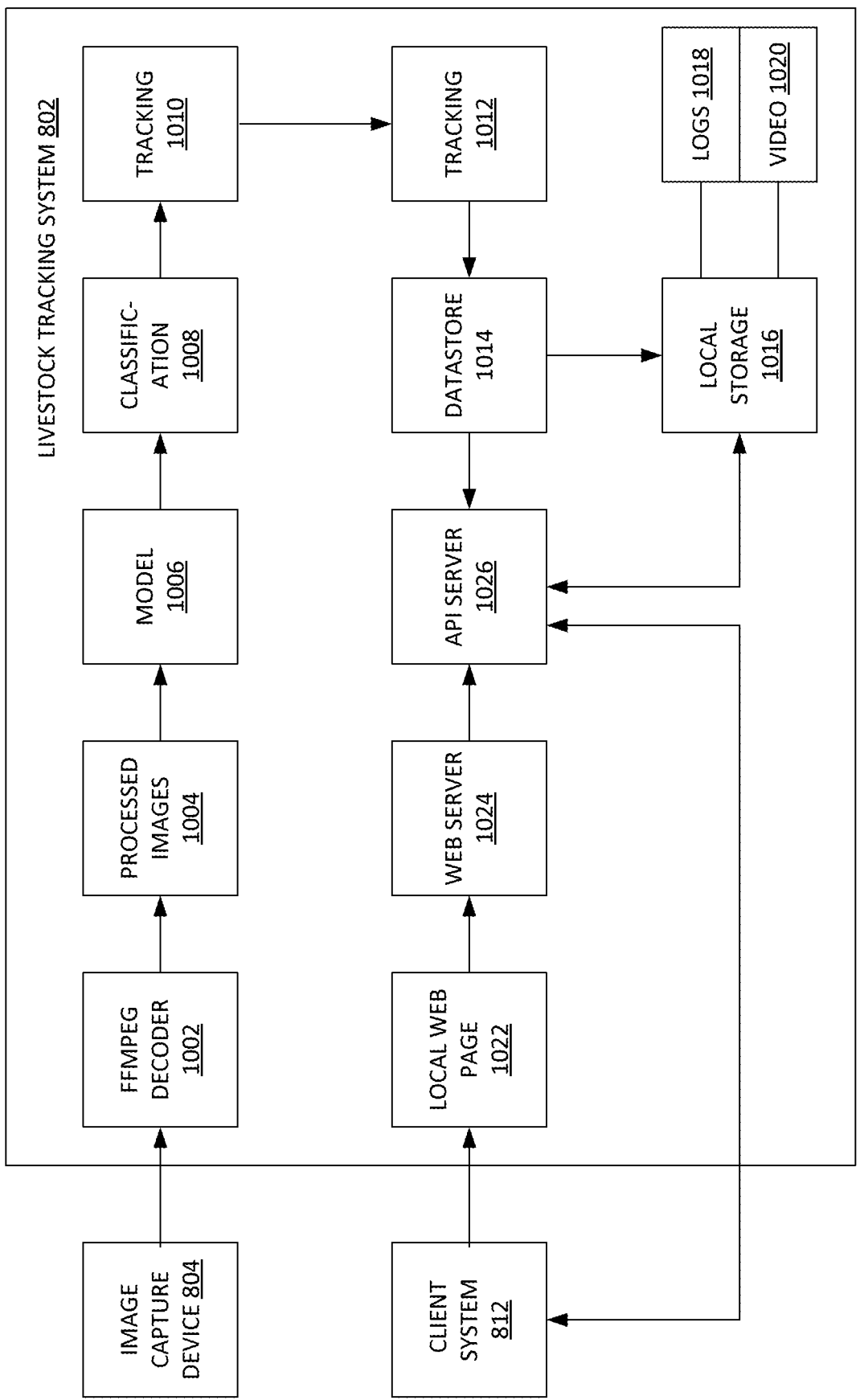
FIG. 10 depicts a process for tracking livestock in some embodiments.

FIG. 10 depicts a process for tracking livestock in some embodiments. In the example of FIG. 10, the image capture device 804 provides images to the livestock tracking system 802. The livestock tracking system 802 may provide livestock counts to the client system 812.

In one example, a truck carrying livestock may deliver livestock to a facility. Once a total weight is provided (e.g., using a scale), the cattle may enter the livestock path. Counting of the livestock may occur as the livestock walk from the scale. In the prior art, there may be video while staff (i.e., people) manually count the animals. If there is a discrepancy, the staff may replay the video for a session instead of a physical recount.

In step 10, the input engine 902 receives the stream from the image capture device 804. The image capture device 804 may provide video or a stream at any speed. In some examples, the image capture device 804 provides a stream at 15 to 60 fps.

In one example, the image capture device 804 is positioned over a livestock path, such as a cattle chute or in front of a cattle gate. A worker may open the gate to initiate the livestock counting process. The swing open of the gate of a cattle chute, for instance, may satisfy a trigger condition to start the counting process. Similarly, in some embodiments, the closing of the gate may also satisfy a trigger condition to stop the counting process. In another example, the image processing engine 904 may detect a large animal such as a cow walking down the livestock path. The detection of a large animal livestock path may be an indication to begin the counting process.

It will be appreciated that any type of detectable event captured by image capture device 804 may be utilized to satisfy a trigger condition and begin the counting process. Similarly, any type of detectable event captured by the image capture device 804 may be utilized to satisfy a trigger condition and stop the counting process.

The image processing engine 904 may apply a decoder to the stream of images received by the image capture device 804. In one example, the image processing engine 904 may utilize an FFMPEG decoder to decode the images and identify any number of images from the stream. In some embodiments, the image processing engine 904 may select an image periodically (e.g., selecting images at time intervals, based on interrupts, or based on the amount of video received).

In step 1004, the AI engine 906 may process the images. In some embodiments, the AI engine 906 and/or the image processing engine 904 may transform any number of images to grayscale, where each grayscale value has a different identity. This optional process may be used to assist in discarding overlapping or occluded detections. Images that show grayscale animals as being contiguous may be processed by the AI engine 906 and/or the image processing engine 904 to only include the largest cluster (or largest clusters relative to other detected clusters in the image) of connected pixel per detection. Clustering may assist in simplifying noisy raw detections.

In step 1006, the AI engine 906 may apply any number of models for segmentation mask creation. In various embodiments, the livestock tracking system 802 adds a branch for predicting segmentation masks on each region of interest (RoI) in parallel with the existing branch for classification and bounding box/non-rectangular, polygonal shape regression. FIG. 7B depicts bounding boxes around regions of interest (i.e., objects in the image) detected by the AI engine in one example.

The AI Engine 906 may apply a fully convolutional network (FCN) to each RoI of an image to predict a segmentation mask in a pixel to pixel manner. This process is different than Faster R-CNN which was not designed for pixel-to-pixel alignment between network inputs and outputs. For example, Faster R-CNN utilizes RoIPool as the core operation for attending to instances and performs coarse spatial quantization for feature extraction. To correct misalignment, the AI engine 906 applies a quantization-free layer that preserves spatial locations (i.e., RoIAlign discussed herein). This correction may significantly improve segmentation mask accuracy relative to Faster R-CNN.

In some embodiments, the AI engine 906 decouples segmentation mask and class prediction. The AI engine 906 may predict a binary segmentation mask for each class independently without competition among classes and rely on the network's RoI classification to predict the category. FCNs do not perform as well because they perform per-pixel multi-class categorization which couples segmentation and classification.

The AI engine 906 may process an image using a region proposal network (RPN) to propose candidate object bounding boxes by sliding a network over a convolutional feature map outputted from a previous convolutional layer. In various embodiments, the AI engine 906 utilizes non-rectangular, polygonal shapes rather than bounding boxes to improve accuracy. FIG. 7B depicts bounding boxes in one example. The main source of double counting is when there is an animal identity (e.g., ID 13) that is transferred to another animal. This error may be mitigated by switching from a bounding box based to a non-rectangular, polygonal-shape based tracker.

The AI engine 906 may extract features using RoIAlign from each candidate box (or candidate non-rectangular, polygonal shape) and performs classification and (bounding box or non-rectangular, polygonal shape) regression. In parallel to predicting the class and offset, the AI engine 906 outputs a binary segmentation mask for each RoI (this is in contrast to systems where classification depends on segmentation mask predictions).

During training, the training engine 912 may define a multi-task loss on each sampled RoI as we define a multi-task loss on each sampled RoI as $L=L_{cls}+L_{box}+L_{mask}$. The segmentation mask branch has a $Km^2$ dimensional output for each RoI. In some embodiments, the definition of the $L_{mask}$ may allow the training engine 912 to generate a segmentation mask for every class without competition among classes (e.g., this decouples the segmentation mask and class prediction common when applying FCNs).

A segmentation mask may encode an input objects spatial layout. As a result, extracting the spatial structure of segmentation masks may be addressed by pixel-to-pixel correspondence provided by convolutions.

The segmentation masks may be non-rectangular, polygonal boxes. The AI engine 906 may then apply models to identify the segmentation masks within the image as livestock.

In step 1008, the classification engine 908 may review the segmentation masks and classify any number of the segmentation masks. Any number of the segmentation masks may be classified as containing an image of an animal for counting. The classification engine 908 may utilize one or more models to classify any number of segmentation masks. In various embodiments, the AI engine 906 performs the classification.

In steps 1010 and 1012, the livestock tracking system 802 may track images of the livestock as the animal moves across the livestock path 808. As discussed herein, the livestock tracking system 802 may receive multiple images of the livestock path 808 as the livestock travel from one end to the other. The livestock may enter in a registration zone and exit in a deregistration zone. The registration zone may be a portion of the livestock path (e.g., a region) where the animals enter and begin walking along the livestock path 808. The deregistration zone may be a portion of the livestock path (e.g., another region) where the animals exist the livestock path 808. As additional images are received by the livestock tracking system 802, the images may be decoded, processed, segmentation masks created, and animals categorize/identified. The segmentation masks may be compared between images to confirm previous categories and/or assess if multiple animals were previously contained within a single segmentation mask. If multiple animals appear in different images, the AI engine 906 may track and count the livestock.

In step 1014, the AI engine 906 and/or the classification engine 908 may store the video, segmentation masks, and/or other information in the livestock datastore 916. In some embodiments, in step 1016, the video, segmentation masks, and/or other information may be stored in local storage (e.g., storage that is local to the livestock tracking system 802). In various embodiments, all or part of the video, segmentation masks, and/or other information may be stored within cloud storage (e.g., within a storage system). In step 1018, information (e.g., segmentation masks, counts, and the like) may be stored within logs of the livestock datastore 916. In step 1020, video may be optionally stored in the livestock datastore 916 or in another storage (e.g., within the livestock tracking system 802, the control system, and/or the client system 812).

The client system 812 may retrieve or display the count for livestock in real time (e.g., during the count) or after a count is completed. For example, the livestock tracking system 802 may receive video and/or images from the image capture device 804 as the animals cross the livestock path 808. The livestock tracking system 802 may count the animals as they cross, enter, or leave the livestock path 808 (i.e., in real time). Similarly, the livestock tracking system 802 may provide the client system 812 with current counts that increase as the animals cross the livestock path 808. In some embodiments, the livestock tracking system 802 counts the animals in real time (i.e., as the animals cross the livestock path 808) but does not provide the subcount or total animal count until the counting is completed (e.g., the trigger condition indicates that counting is to stop).

The client system 812 may retrieve or display the information in any number of ways. In one example, in step 322, the client system 812 may utilize an application (e.g., an app) or browser to navigate to a local web page. The local web server may communicate with the web server in step 324 to retrieve the livestock count using an API configured to communicate with or through the API server in step 326 to retrieve video, information, and/or livestock count.

In various embodiments, the client system 812 may communicate with the livestock tracking system 802 over or using a webpage and Web server. For example, the web server may provide a webpage accessible to the client system 812. In some embodiments, the client system 812 may be required to register and/or log into the Web server, control system, or other device to access the webpage. Log information and or information retrieved from the datastores may be logged or otherwise tracked and stored in the user log database 914. The webpage may indicate a livestock count. In various embodiments, the client system 812 communicates with the web server to access the webpage using a VPN or other encrypted communication methodology. In some embodiments, the webpage may include a video replay of the livestock the passes over the livestock path. The web page may also include a pre-count and/or manual count entry to assist in validating overall counting accuracy of livestock.

The client system 812 may communicate with a web page or other interface that displays a video replay option to review stored video (e.g., in the livestock datastore 916) used for livestock counting. The interface may also display counting as the livestock move across the livestock path 808 in the video. In some embodiments, the interface may display a date, location, and count of livestock that was counted by the livestock tracking system 802 at the date and location. In some embodiments, previous counts (e.g., counts of animals as they were loaded on a truck or before any time before they walked across the livestock paths) may be displayed along with the count of the tracking system 802.

Figure 11:
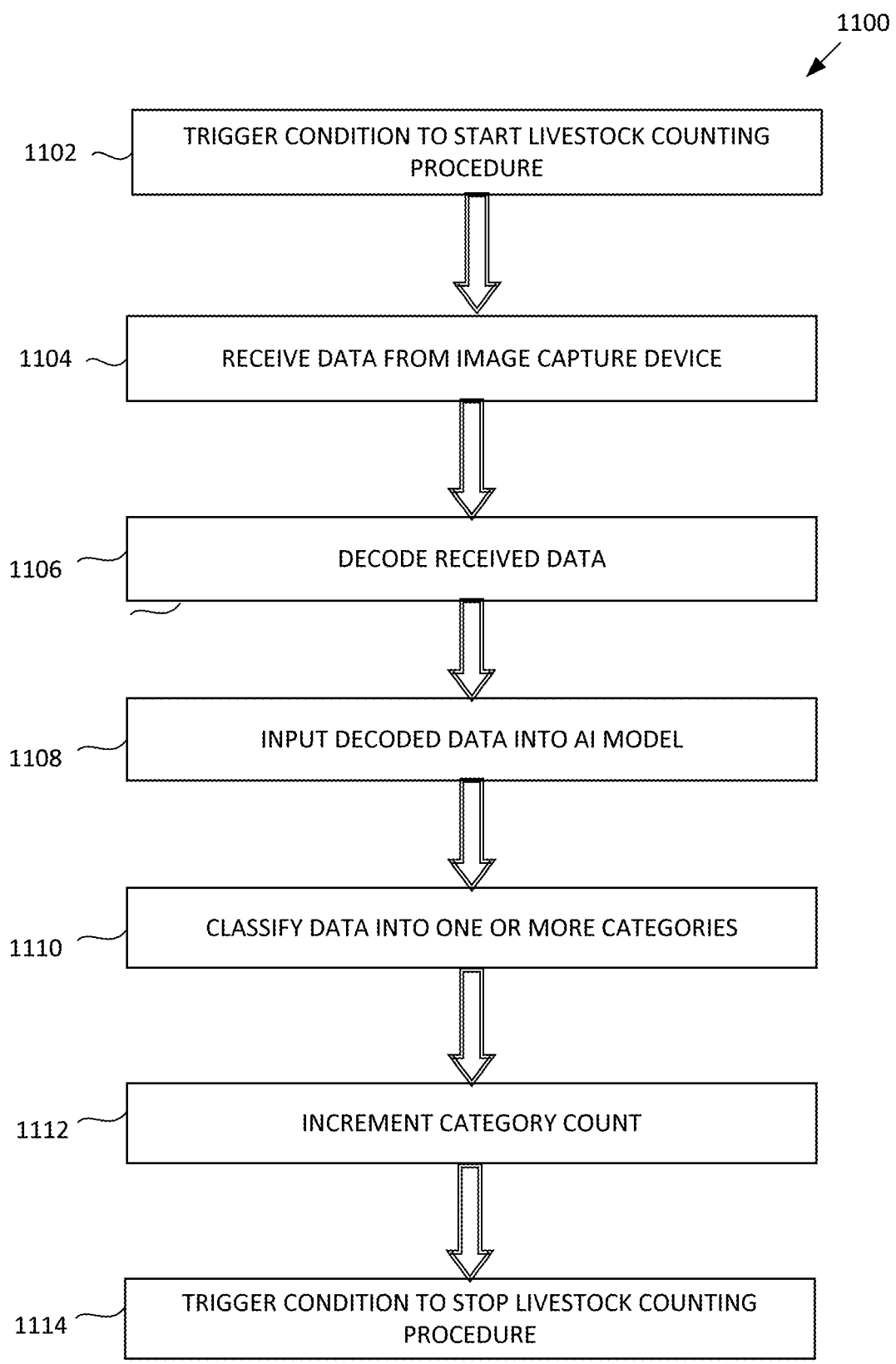
FIG. 11 is a flowchart for tracking and counting livestock in some embodiments.

FIG. 11 is a flowchart for tracking and counting livestock in some embodiments. In this example, the livestock incudes only pigs. In step 1102, a trigger condition is satisfied to start livestock counting. In one example, the livestock tracking system 802 may receive a manual trigger, such as a command or physical switch, to begin the livestock counting process.

In other embodiments, the image processing engine 904 may identify an event within an image as satisfying a trigger condition. For example, the image capture device 804 may provide a stream of images or video to the livestock tracking system 802, even if the livestock tracking system 802 has not yet engaged in the process of counting animals. The input engine 902 may receive the stream and utilize a decoder to decode the images from the stream in step 1104. The input engine 902 may also select any number of images for processing. Image processing engine 904 may access our exam of the images to detect an event that may trigger the counting process.

Once the counting process has begun, the input engine 902 receives video from the image capture device 804. In step 1106, the image processing engine 904 or the input engine 902 may decode the received data and select images to be processed by the image processing engine 904.

In step 1108, the AI engine 906 receives the decoded data and applies any number of models for candidate region proposal selection, object classification, tightening of the non-rectangular, polygonal shape(s), object identification, and counting. The image processing engine 904 may utilize Mask R-CNN (a U-Net approach) for instance segmentation and identifying livestock for counting.

Figure 12:
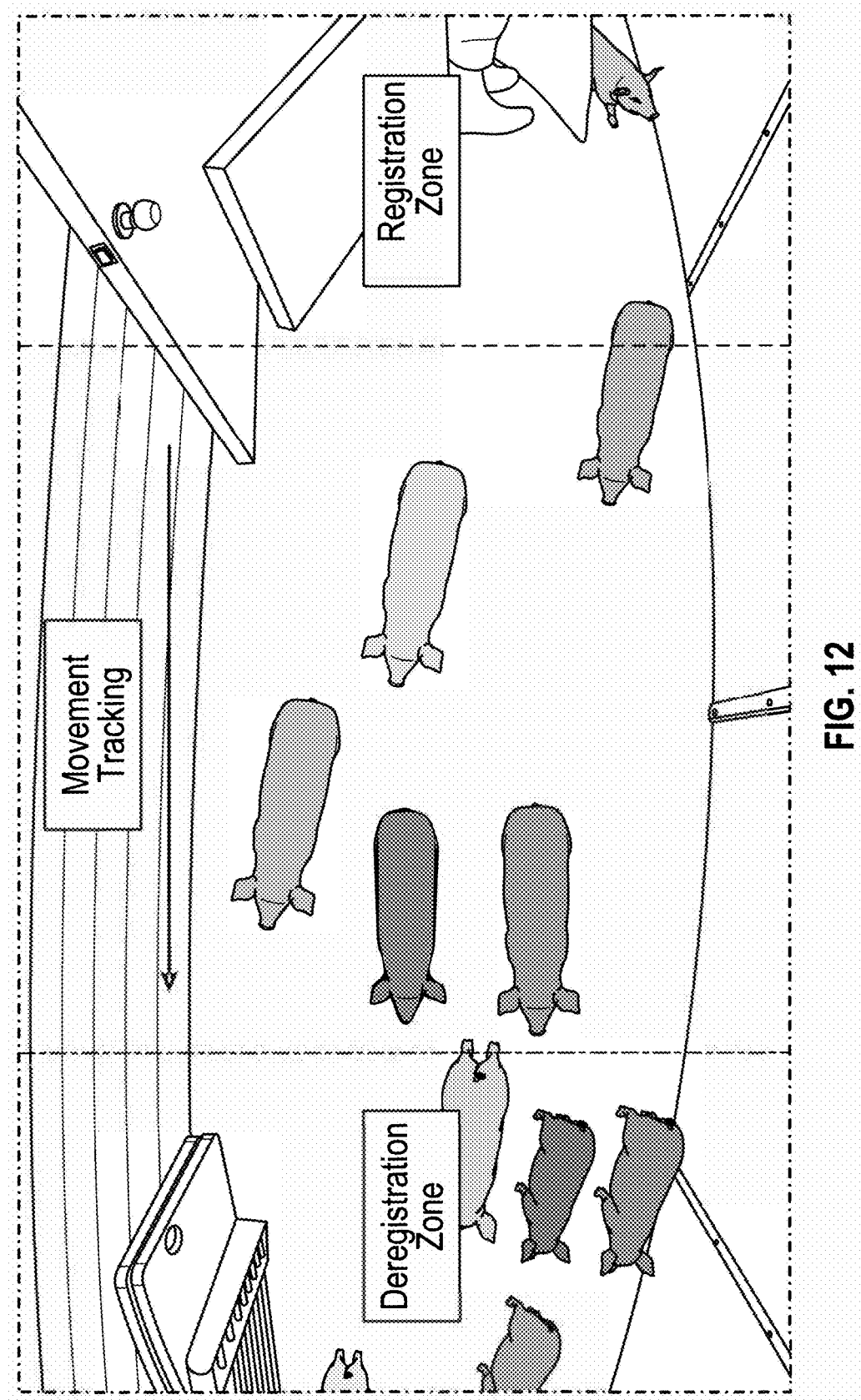
FIG. 12 depicts a field of view of an image capture device which is divided into three sections including a registration zone, movement tracking zone, and deregistration zone in some embodiments.

In one example, the system may be used to count pigs. The pigs may travel along a livestock path 808. In FIG. 12, the field of view of an image capture device 804 may be divided into three sections including a registration zone, movement tracking zone, and deregistration zone. Pigs typically will travel from the registration zone through the movement tracking zone and out through the deregistration zone.

In various embodiments, the livestock tracking system 802 may utilize these regions in any number of ways. In some embodiments, the livestock tracking system 802 receives images from each different zone and identifies the animals in each zone. The livestock tracking system 802 may identify and count the animals in the registration zone as well as identify and count the animals in the deregistration zone. If the same animals are identified and counted in the different zones, the counts should be the same. If the counts are different, the livestock tracking system 802 may assess or re-assess the images (and/or additional images in the movement tracking zone) to evaluate the decision-making that identified the animals. For example, if two animals were close together in the registration zone, the livestock tracking system 802 may have counted the animals as a single animal. As the animals move across the movement tracking zone into the deregistration zone, the animals may have separated. By assessing or reviewing images from the movement tracking zone into the deregistration zone, the livestock tracking system 802 may track the animals, identify the error, log the process, and update the count.

Similarly, if two animals were close together in the deregistration zone, the livestock tracking system 802 may have counted the animals as a single animal. As the animals move across the movement tracking zone into the deregistration zone, the animals may have started to move more closely together. By assessing or reviewing images from the registration zone, through the movement tracking zone into the deregistration zone, the livestock tracking system 802 may track the animals, identify the error, log the process, and update the count.

The livestock tracking system 802 may utilize registration zones and deregistration zones as well as frame skip allowances to tune performance.

It will be appreciated that this process may be utilized with any animals (not just pigs) or combination of animals.

Figure 13A:
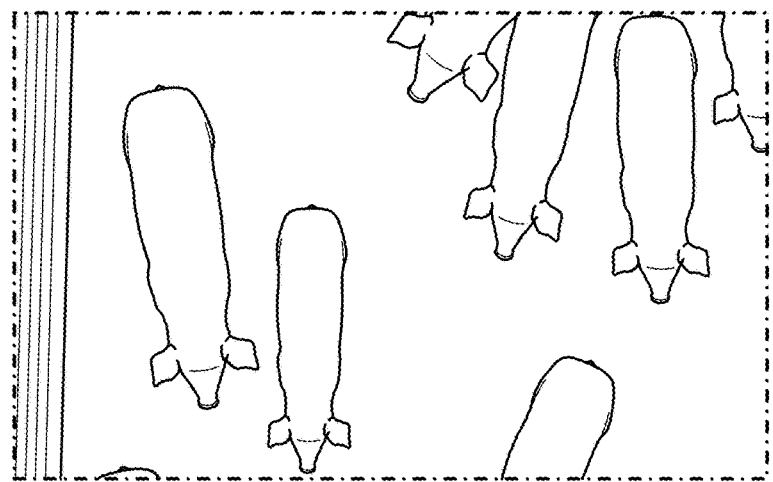
FIG. 13A depicts an image received by the livestock tracking system in an example.
Figure 13B:
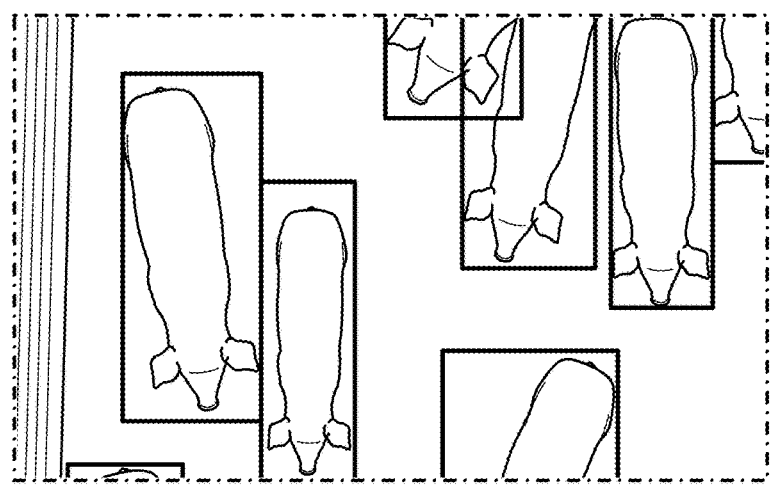
FIG. 13B depicts each pig within a bounding box in an example.
Figure 13C:
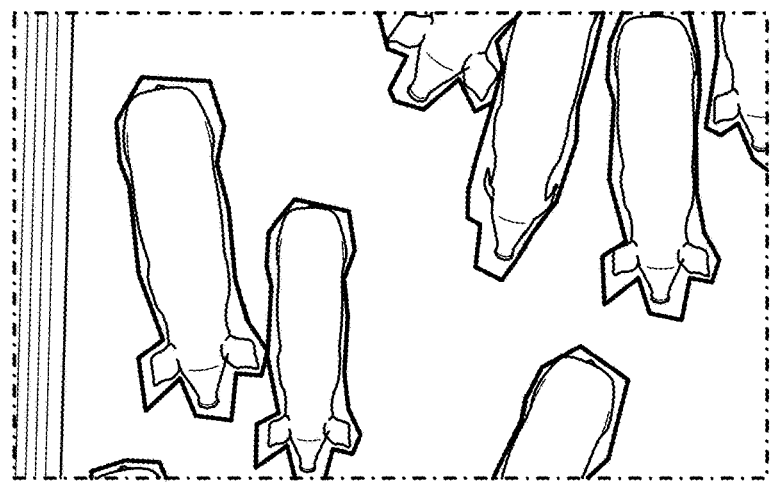
FIG. 13C depicts each pig within a non-rectangular, polygonal shape in an example.

In various embodiments, bounding boxes or non-rectangular, polygon shapes are used to create regions for selection and/or classification. FIGS. 13A-C depict pigs cross over the livestock path 808. FIG. 13A depicts an image received by the livestock tracking system 802 in an example. FIG. 13B depicts each pig within a bounding box in an example. FIG. 13C depicts each pig within a non-rectangular, polygonal shape in an example. Bounding boxes provide the advantages of providing a faster inference and faster labels. However, detection and tracking are more difficult, particularly if the animals are close together. Non-rectangular, polygonal shapes may provide for slower inference and labeling when compared with bounding boxes, however, they provide for more accurate detection and tracking.

When tracking with bounding boxes, the AI engine 906 may apply deepsort. For example, the AI engine 906 may apply a simple online and real time tracking with a deep association metric. This may work well at low frame rates and incorporates visual distinctions and motion information. Unfortunately, overlapped bounding boxes may confuse the model.

When tracking with non-rectangular, polygonal shapes, tracking may be performed by intesection-over union (IoU). IoU is determined by dividing the areas of overlap by the area of union of non-rectangular, polygonal shapes. This process can be very accurate at high frame rates. Visual distinction, however, may be lost and may not be as useful on low frame rates.

In various embodiments, polygonal shapes with IoU provided for an increase of accuracy in animal identification and counting over bounding boxes with deep sort.

In various embodiments, when non-rectangular, polygonal shapes are used rather than bounding boxes, the AI engine 906 may utilize a mask criteria to assist in the selection of RoI. For example, the non-rectangular, polygonal shapes may be required to be of a sufficient size and/or shape to approximate the animal to be counted (e.g., pigs) and/or approximate pigs of an expected age range.

As discussed herein, the AI engine 906 may utilize Mask R-CNN for instance segmentation. The AI engine 906 may utilize a full CNN on the top of CNN features from an image generate a mask segmentation output. The AI engine 906 may add a branch to output a binary mask that says whether a pixel is part of an object that runs in parallel to the region proposal network. The AI engine 906 may utilize the Region Proposal Network by passing a sliding window over the CNN feature map and outputting K potential non-rectangular, polygonal shapes (e.g., as opposed to bounding boxes). The AI engine 906 may score each non-rectangular, polygonal shape, utilizing a cls layer for scores and reg layer for coordinates. For each anchor shape (e.g., anchor box or anchor non-rectangular, polygonal shape), the AI engine 906 may output a score for position in the image.

The AI engine 906 may pass each selected non-rectangular, polygonal shape (e.g., expected to be an image) through FAST CNN for classification and tightening. As discussed herein, rather than RoI pool, RoIAlign may perform a forward pass of the image.

In step 1110, the classification engine 908 may classify data into one or more categories. When performing a count of a single type of animal (e.g., pigs or cows), classification is simplified because of the lack of variety. In some embodiments, any number of SVMs may classify if a selected non-rectangular, polygonal shape is an object, and if so, categorize and/or label the object (e.g., identify the pig).

In step 1112, the tracking engine 910 may track pigs across the field of view (e.g., across the zones) and/or may count the animals. For example, the tracking engine 910 may increment a count as they pass through the registration zone or a livestock path 808 exit (opposite of the entrance of the livestock). If an animal travels in the other direction, the tracking engine 910 may decrement the count. In this example, if the animal ultimately turns around and travels back across the livestock path 808 to the exit, the tracking engine 910 may increment the count.

In some embodiments, the tracking engine 910 does not increment a count until the animal enters or leaves the deregistration zone away from the livestock path 808.

In step 1114, a trigger condition is satisfied to stop livestock counting. In one example, the livestock tracking system 802 may receive a manual trigger, such as a command or physical switch, to stop the livestock counting process. In some embodiments, the trigger condition may be a detection of a gate being closed, identification within an image of a closed gate, identification within an image of a sign held or positioned in the livestock path 808, or the like.

While the livestock tracking system 802 and FIG. 1 is depicted as being in communication with only the client system 812 and the image capture device 804, it will be appreciated that the livestock tracking system 802 may, in some embodiments, be in communication with a livestock counting server for control system via the communication network. For example, a livestock control system may provide updates or extend functionality of any number of livestock tracking systems for any number of different customers. In some embodiments, the livestock tracking system 802 that is proximate to an image capture device 804 may provide services to a local client system 812. Alternately, the livestock tracking system 802 that is proximate to image capture device 804 may provide services to any number of remote client systems 812.

In some embodiments, a livestock tracking system 802 may work with a livestock control system to perform image processing and/or model analysis. For example, the livestock tracking system 802 may provide processed images or decoded video to the livestock control system on a network. The livestock control system may utilize cloud-based resources to perform analysis, perform training, perform instant segmentation, and/or the like. In other embodiments, the livestock control system may update models and/or image processing analytics to any number of livestock tracking system 802 over any number of communication networks.

FIG. 14 is a block diagram illustrating a digital device in one example. The digital device may read instructions from a machine-readable medium and execute those instructions by a processor to perform the machine processing tasks discussed herein, such as the engine operations discussed above. Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes a processor 1402 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1404, and a static memory 1406, which are configured to communicate with each other via a bus 1408. The computer system 1400 may further include a graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a data store 1416, a signal generation device 1418 (e.g., a speaker), an audio input device 1426 (e.g., a microphone) and a network interface device 1420, which also are configured to communicate via the bus 1408.

The data store 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network (not shown) via network interface 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 14. Alternatively, hardware or software engines may be stored elsewhere within a computing system.

As referenced herein, a computer or computing system includes hardware elements used for the operations described here regardless of specific reference in FIG. 14 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
   at least one processor;
   first memory, the first memory containing instructions to control any number of the at least one processor to:
   provide a first user interface displaying a first image taken by a first image capture device, the first image capture device including a first field of view, the first image including a depiction of a first object, the first object being of a particular type, the first image including a first bounding shape placed by a first user around the depiction of the first object using a shape tool provided by the first user interface;

extract a first portion of the first image, the first portion including only contents of the first image that are contained within the first bounding shape including the depiction of the first object;

retrieve first high-level features and first low-level features from the first portion, the first high-level features including low spatial information content and high semantic content of the first portion, the first low-level features including high spatial information content and low semantic content of the first portion;

apply first Atrous Spatial Pyramid Pooling (ASPP) to the first high-level features of the first portion to aggregate the first high-level features as first aggregate features, the applying the first ASPP including applying any number of convolutional layers in parallel and at different rates from each other to the first high-level features and concatenating results to create the first aggregate features;

up-sample the first aggregate features;

apply a convolution to the first low-level features;

concatenate the first aggregate features after upsampling with the first low-level features after convolution to form first combined features;

segment the first combined features to generate a first polygonal shape outline along first outer boundaries of the first object in the first portion, segmenting comprising batch normalization and application of a rectified linear activation function on the first combined features; and display the first image in the first user interface and the first polygonal shape outline of the first object in the first user interface, the first image not including the first bounding shape placed by the first user; and a second memory, the second memory containing instructions to control the any number of the at least one processor to:

receive a second image from a second image capture device, the second image capture device being positioned over a second path, the second image containing a depiction of a second object, the second object being of the particular type;

generate feature maps from the second image by applying at least a first convolutional neural network;

slide a first window across the feature maps to obtain a plurality of anchor shapes using a region proposal network;

determine if each anchor shape of the plurality of anchor shapes contains an object to generate a plurality of regions of interest, each of the plurality of regions of interest being a non-rectangular, polygonal shape;

extract feature maps from each region of interest;

classify objects in each region of interest using a pretrained convolutional neural network, trained in part using the first polygonal shape outline of the first object;

in parallel with classification, predict segmentation masks on at least a subset of the plurality of regions of interest in a pixel-to-pixel manner;

identify individual objects of the second image based on classifications and the segmentation masks;

count individual objects based on the identification; and provide the count to a third digital device for display.

2. The system of claim 1, wherein the shape tool enables the user to draw a box around the first object in the first image.

3. The system of claim 1, wherein the shape tool enables the user to place a box around the first object in the first image.

4. The system of claim 1, further comprising a first digital device configured to provide the first user interface, display the at least one image, and provide at least the first portion to a second digital device over a network, the second digital device configured to retrieve the first high-level features and first low-level features, apply the ASPP to the first high-level features, up-sample the first aggregate features, apply the convolution to the first low-level features, concatenate the first aggregate features with the first low-level features, segment and update the first combined features, and provide the first polygonal shape outline to the first digital device, the first digital device further configured to display the first image in the first user interface and the first polygonal shape outline of the first object in the first user interface.

5. The system of claim 4,
wherein the third digital device is remote from the first digital device, the third digital device configured provide a second user interface displaying a second image taken by the second image capture device, the first second including the depiction of the second object, the second image including a second bounding shape placed by a second user around the depiction of the second object using the shape tool provided by the second user interface, and extract a second portion of the second image, the second portion including only contents of the second image that are contained within the second bounding shape including the depiction of the second object, and the second digital device further configured to retrieve second high-level features and second low-level features from the second portion, the second high-level features including low spatial information content and high semantic content of the second portion, the second low-level features including high spatial information content and low semantic content of the second portion, apply the first Atrous Spatial Pyramid Pooling (ASPP) to the second high-level features of the second portion to aggregate the second high-level features as second aggregate features, the first ASPP including applying any number of convolutional layers in parallel and at different rates from each other to the second high-level features and concatenating results to create the second aggregate features, up-sample the second aggregate features, apply a convolution to the second low-level features, concatenate the second aggregate features after upsampling with the second low-level features after convolution to form second combined features, segment and update the second combined features to generate a second polygonal shape outline along second outer boundaries of the second object in the second portion, and the third digital device further configured to display the second image in the second user interface and the second polygonal shape outline of the second object, the second image not including the second bounding shape placed by the second user.

6. The system of claim 1, the first memory containing further instructions to control any number of the at least one processor to further upsample the first polygonal shape outline.

7. The system of claim 1, wherein extracting the feature maps from the regions of interest comprises performing RoIAlign to extract the feature maps from each region of interest, ROIAlign utilizing binary interpolation to preserve spatial information which would otherwise get misaligned if ROI pool was applied.

8. The system of claim 1, wherein each anchor shape is a non-rectangular, polygonal shape.

9. A system comprising:
a first digital device comprising:
at least one of a first processor;
a memory, the memory containing instructions to control any number of the at least one of the first processor to:
provide a first user interface displaying a first image taken by a first image capture device, the first image including a depiction of a first object, the first object being of a particular type,
in response to a shape tool of the first user interface used by a first user, placing a first bounding shape around the depiction of the first object,
in response to a command from the user interface, crop a first portion of the first image, the first portion including contents of the first image that are contained within the first bounding shape including the depiction of the first object but not including contents of the first image outside the first bounding shape,
a second digital device comprising:
at least one of a second processor;
a memory, the memory containing instructions to control any number of the at least one of the second processor to:
receive the first portion from the first digital device,
retrieve first high-level features and first low-level features from the first portion, the first high-level features including low spatial information content and high semantic content of the first portion, the first low-level features including high spatial information content and low semantic content of the first portion,
apply first Atrous Spatial Pyramid Pooling (ASPP) to the first high-level features of the first portion to aggregate the first high-level features as first aggregate features, the applying the first ASPP including applying any number of convolutional layers in parallel and at different rates from each other to the first high-level features and concatenating results to create the first aggregate features,
up-sample the first aggregate features,
apply a convolution to the first low-level features,
concatenate the first aggregate features after upsampling with the first low-level features after convolution to form first combined features,
segment the first combined features to generate a first polygonal shape outline along first outer boundaries of the first object in the first portion, segmenting comprising batch normalization and application of a rectified linear activation function on the first combined features, and
provide the first polygonal shape outline to the first digital device to enable the first digital device to display, in the first user interface, the first image and the first polygonal shape outline of the first object, and
a third digital device comprising:
at least one of a third processor;
a memory, the memory containing instructions to control any number of the at least one of the third processor to:
receive a second image from a second image capture device, the second image capture device being positioned over a second path, the second image containing a depiction a second object, the second object being of the particular type;
generate feature maps from the second image by applying at least a first convolutional neural network;
slide a first window across the feature maps to obtain a plurality of anchor shapes using a region proposal network;
determine if each anchor shape of the plurality of anchor shapes contains an object to generate a plurality of regions of interest, each of the plurality of regions of interest being a non-rectangular, polygonal shape;
extract feature maps from each region of interest;
classify objects in each region of interest using a pretrained convolutional neural network, trained in part using the first polygonal shape outline of the first object;
in parallel with classification, predict segmentation masks on at least a subset of the plurality of regions of interest in a pixel-to-pixel manner;
identify individual objects of the second image based on classifications and the segmentation masks;
count individual objects based on the identification; and
provide the count to a third digital device for display.

10. The system of claim 9, wherein the shape tool enables the user to draw a box around the first object in the first image.

11. The system of claim 9, wherein the shape tool enables the user to place a box around the first object in the first image.

12. The system of claim 9,
wherein the third digital device is remote from the first digital device, the third digital device configured to:
provide a second user interface displaying at least one of the second image taken by the second image capture device, the at least one second including the depiction of the second object, the second image including a second bounding shape placed by a second user around the depiction of the second object using the shape tool provided by the second user interface, and extract a second portion of the second image, the second portion including only contents of the second image that are contained within the second bounding shape including the depiction of the second object,
the second digital device further configured to retrieve second high-level features and second low-level features from the second portion, the second high-level features including low spatial information content and high semantic content of the second portion, the second low-level features including high spatial information content and low semantic content of the second portion, apply the first Atrous Spatial Pyramid Pooling (ASPP) to the second high-level features of the second portion to aggregate the second high-level features as second aggregate features, the first ASPP including applying any number of convolutional layers in parallel and at different rates from each other to the second high-level features and concatenating results to create the second aggregate features, up-sample the second aggregate features, apply a convolution to the second low-level features, concatenate the second aggregate features after upsampling with the second low-level features after convolution to form second combined features, segment and update the second combined features to generate a second polygonal shape outline along second outer boundaries of the second object in the second portion, and the third digital device further configured to display the second image in the second user interface and the second polygonal shape outline of the second object, the second image not including the second bounding shape placed by the second user.

13. The system of claim 9, the second digital device further configured to upsample the first polygonal shape outline.

14. The system of claim 9, wherein extracting the feature maps from the regions of interest comprises performing RoIAlign to extract the feature maps from each region of interest, ROIAlign utilizing binary interpolation to preserve spatial information which would otherwise get misaligned if ROI pool was applied.

15. The system of claim 9, wherein each anchor shape is a non-rectangular, polygonal shape.

16. The system of claim 9, wherein classification does not depend upon segmentation masks.

17. The system of claim 9, wherein each segmentation mask encodes an associated object's spatial layout.

18. A non-transitive computer readable medium comprising instructions to a control at least one processor to perform a method, the method comprising:

providing a first user interface displaying a first image taken by a first image capture device, the first image capture device including a first field of view, the first image including a depiction of a first object, the first object being of a particular type, the first image including a first bounding shape placed by a first user around the depiction of the first object using a shape tool provided by the first user interface;

extracting a first portion of the first image, the first portion including only contents of the first shape that are contained within the first bounding shape including the depiction of the first object;

retrieving first high-level features and first low-level features from the first portion, the first high-level features including low spatial information content and high semantic content of the first portion, the first low-level features including high spatial information content and low semantic content of the first portion;

applying first Atrous Spatial Pyramid Pooling (ASPP) to the first high-level features of the first portion to aggregate the first high-level features as first aggregate features, the applying the first ASPP including applying any number of convolutional layers in parallel and at different rates from each other to the first high-level features and concatenating results to create the first aggregate features;

up-sampling the first aggregate features;

applying a convolution to the first low-level features;

concatenating the first aggregate features after upsampling with the first low-level features after convolution to form first combined features;

segmenting the first combined features to generate a first polygonal shape outline along first outer boundaries of the first object in the first portion, segmenting comprising batch normalization and application of a rectified linear activation function on the first combined features;

displaying the first image in the first user interface and the first polygonal shape outline of the first object in the first user interface, the first image not including the first bounding shape placed by the first user; and receiving a second image from a second image capture device, the second image capture device being positioned over a second path, the second image containing a depiction of a second object, the second object being of the particular type;

generating feature maps from the second image by applying at least a first convolutional neural network;

sliding a first window across the feature maps to obtain a plurality of anchor shapes using a region proposal network;

determining if each anchor shape of the plurality of anchor shapes contains an object to generate a plurality of regions of interest, each of the plurality of regions of interest being a non-rectangular, polygonal shape;

extracting feature maps from each region of interest;

classifying objects in each region of interest using a pretrained convolutional neural network, trained in part using the first polygonal shape outline of the first object;

in parallel with classification, predicting segmentation masks on at least a subset of the plurality of regions of interest in a pixel-to-pixel manner;

identifying individual objects of the second image based on classifications and the segmentation masks;

counting individual objects based on the identification; and providing the count to a third digital device for display.

* * * * *